United States Patent
Wu

(10) Patent No.: US 10,651,937 B2
(45) Date of Patent: May 12, 2020

(54) METHOD AND SYSTEM FOR HIGH-PRECISION LONG-DISTANCE DISTRIBUTED FIBER-OPTIC TIME TRANSFER

(71) Applicant: Shanghai Jiao Tong University, Shanghai (CN)

(72) Inventor: Guiling Wu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 16/282,236

(22) Filed: Feb. 21, 2019

(65) Prior Publication Data

US 2019/0190601 A1 Jun. 20, 2019

Related U.S. Application Data

(63) Continuation of application No. PCT/CN2017/080969, filed on Apr. 18, 2017.

(30) Foreign Application Priority Data

Aug. 31, 2016 (CN) .......................... 2016 1 0781482

(51) Int. Cl.
*H04B 10/00* (2013.01)
*H04B 10/25* (2013.01)
(Continued)

(52) U.S. Cl.
CPC ......... *H04B 10/2503* (2013.01); *H04B 10/25* (2013.01); *H04B 10/29* (2013.01);
(Continued)

(58) Field of Classification Search
CPC ................ H04B 10/40; H04B 10/0795; H04B 10/2053; H04L 7/0075; H04J 3/0658; H04J 3/0635; H04J 3/0673; H04J 3/0652
(Continued)

(56) References Cited

U.S. PATENT DOCUMENTS

| 2012/0213529 A1 | 8/2012 | Hedekvist et al. |
| 2014/0270805 A1* | 9/2014 | Mani ............... H04J 3/0667 398/155 |
| 2018/0062825 A1* | 3/2018 | Miao ............ H04B 10/0795 |

FOREIGN PATENT DOCUMENTS

| CN | 103546224 A | 1/2014 |
| CN | 103546225 A | 1/2014 |

(Continued)

OTHER PUBLICATIONS

Śliwczyński et al., "Dissemination of time and RF frequency via a stabilized fiber optic link over a distance of 420 km," Metrologia, vol. 50, pp. 133-145 (Jan. 2013).

(Continued)

*Primary Examiner* — Hanh Phan
(74) *Attorney, Agent, or Firm* — Mei & Mark LLP; Manni Li

(57) ABSTRACT

A method and system for high-precision long-distance distributed fiber-optic time transfer. The system comprises a first clock source, a first fiber-optic time transfer unit, N relay and user units, M bidirectional optical amplifying units, a second fiber-optic time transfer unit, and a second clock source. Each relay and user unit obtains timing signals synchronized with the first clock source according to time interval between received forward and backward timing signals and realize distributed fiber-optic time transfer while realizing optical-electric-optical relay of forward and backward transmitted optical signals. Bidirectional time signals pass through the same link to ensure maximum symmetry of the main link bidirectional delay; effect of multiple optical amplifications of noise, such as Rayleigh scattering, on stability of fiber-optic time transfer is avoided by optical- (Continued)

electric-optical process; distributed time transfer is realized by bidirectional timing signal time interval received by the relay and user units.

9 Claims, 9 Drawing Sheets

(51) Int. Cl.
  *H04J 3/06* (2006.01)
  *H04B 10/29* (2013.01)
  *H04B 10/40* (2013.01)
  *H04L 7/00* (2006.01)
(52) U.S. Cl.
  CPC ............ *H04B 10/40* (2013.01); *H04J 3/0638* (2013.01); *H04L 7/0075* (2013.01)
(58) Field of Classification Search
  USPC ....... 398/154, 155, 158, 159, 160, 135, 136, 398/173, 175, 176, 177, 33, 25, 180, 181; 370/503, 516, 395.5, 537
  See application file for complete search history.

(56) References Cited

FOREIGN PATENT DOCUMENTS

| | | |
|---|---|---|
| CN | 104980222 A | 10/2015 |
| CN | 105739215 A | 7/2016 |
| CN | 105790845 A | 7/2016 |

OTHER PUBLICATIONS

Śliwczyński et al., "Bidirectional Optical Amplification in Long-Distance Two-Way Fiber-Optic Time and Frequency Transfer Systems," Instrumentation and Measurement, vol. 62, pp. 253-262 (2013).

M. Amemiya et al., "Precise frequency comparison system using bidirectional optical amplifiers," Instrumentation and Measurement, IEEE Transactions on, vol. 59, pp. 631-640 (2010).

Vojtěch et al., "All optical two-way time transfer in strongly heterogeneous networks," Proc. of SPIE, pp. 92020S-92020S-6 (2014).

P. Krehlik, et al., "Multipoint dissemination of RF frequency in fiber optic link with stabilized propagation delay," IEEE transactions on ultrasonics, ferroelectrics, and frequency control, vol. 60, pp. 1804-1810 (2013).

* cited by examiner

METHOD AND SYSTEM FOR HIGH-PRECISION LONG-DISTANCE DISTRIBUTED FIBER-OPTIC TIME TRANSFER

CROSS-REFERENCE TO RELATED APPLICATIONS

The subject application is a continuation of PCT/CN2017/080969 filed on Apr. 18, 2017, which in turn claims priority on Chinese Application No. CN201610781482.8 filed on Aug. 31, 2016 in China. The contents and subject matter of the PCT international application and the Chinese priority application are incorporated herein by reference.

FIELD OF INVENTION

The invention relates to a method and a system for fiber-optic time transfer in the field of fiber-optic time and frequency transfer, particularly, a method and a system for high-precision long-distance distributed fiber-optic time transfer.

BACKGROUND ART

High-precision time transfer technology finds valuable and important application in the fields of satellite navigation, aerospace industry, deep space exploration, geodesy, and tests of fundamental physics. Current satellite-based time transfer technologies, such as GPS common view (CV) and two-way satellite time transfer (TWSTFT), have a level of precision at the nanosecond. As clock sources with high stability and low uncertainty, such as optical lattice clock, are invented and applied, the current technologies no longer meet the needs of scientific research and social development. A technology of time transfer by laser link (T2L2) with a theoretical uncertainty of better than 100 ps is currently still in development. Furthermore, although the space-based time transfer technology has been proved to be quite mature and feasible, it has disadvantages such as complex system, high cost, long averaging time, poor security, low reliability, and so on. Fiber-optic transmission has the advantages of low loss, large capacity, high speed, high stability, safety, and reliability, and has been widely used in the field of communications. Fiber-optic based time transfer is an effective way to realize high-precision long-distance time transfer. High-precision fiber-optic time transfer is faced with the problem that the transmission delay of the fiber link changes with changes in temperature, stress, transmission wavelength, and other factors. To realize high-precision time transfer, bidirectional time transfer method is widely adopted at present. For long-distance bidirectional fiber-optic time transfer, bidirectional optical amplification must be performed to compensate the attenuation of optical signal. AGH university of Poland discloses a single fiber bidirectional optical amplifier. See Śliwczyński et al., "Dissemination of time and RF frequency via a stabilized fiber optic link over a distance of 420 km," Metrologia, vol. 50, pp. 133-145 (2013 January). Bidirectional amplification of single fiber is realized by replacing isolators at either end of the unidirectional EDFA with filter, and the bidirectional propagation delay symmetry is ensured. However, serious noise accumulation caused by multiple optical amplifications, such as Rayleigh backscattering around optical amplifiers, seriously deteriorates the signal-to-noise ratio and limit the total length of the fiber link. See Śliwczyński et al., "Bidirectional Optical Amplification in Long-Distance Two-Way Fiber-Optic Time and Frequency Transfer Systems," Instrumentation and Measurement, vol. 62, pp. 253-262 (2013).

National Metrology Institute of Japan (NMIJ), see M. Amemiya et al., "Precise frequency comparison system using bidirectional optical amplifiers," Instrumentation and Measurement, IEEE Transactions on, vol. 59, pp. 631-640 (2010), discloses a bidirectional optical amplification scheme for wavelength division multiplexing (WDM) fiber-optic time transfer scheme. Using the WDM to separate and combine wavelengths from two directions, isolators inserted can suppress multiple amplifications of noises such as Rayleigh backscattering. Nevertheless, the improvement of signal-to-noise ratio in the scheme is at the expense of the bidirectional transmission delay asymmetry. The asymmetry has to be calibrated and the total calibrating error increases linearly with the increase of the number of amplifiers.

The CESNET in Czech, see Vojtěch et al., "All optical two-way time transfer in strongly heterogeneous networks," Proc. of SPIE, pp. 92020S-92020S-6 (2014), discloses distributed Raman amplifier to carry out optical amplification of time signal for bidirectional transmission. Although the bidirectional symmetry of the time delay of fiber-optic time transfer link can be ensured, the noise such as Rayleigh scattering can also be multiple optically amplified. Moreover, there are other problems such as high pump power, low efficiency, dependence on the polarization of the input optical signal, and so on.

The two bidirectional optical amplification schemes as disclosed in Chinese Patent Application numbers CN201610216342.6 and CN201610073321.3 can ensure the symmetry of the link to the maximum extent, and effectively avoid the influence of multiple amplifications of noise such as Rayleigh scattering on the time transfer performance of the fiber-optic.

For distributed fiber-optic time transfer, AGH university of Poland, see P. Krehlik, et al., "Multipoint dissemination of RF frequency in fiber optic link with stabilized propagation delay," IEEE transactions on ultrasonics, ferroelectrics, and frequency control, vol. 60, pp. 1804-1810 (2013), discloses inserting a 2×2 optical coupler in the main link, resulting in a portion of forward and backward transferred optical signal for distributed time transfer. However, the approach reduces the power of the optical signal transferred by the main link and also degrade the time transfer stability of the main link.

SUMMARY OF THE INVENTION

The present invention overcomes the deficiency in the existing technologies and provides a method and a system for high-precision long-distance distributed fiber-optic time transfer for a high-precision fiber-optic time transfer scheme based on bidirectional time division multiplexing transmission over a single fiber with the same wavelength.

The present invention provides a system for high-precision long-distance distributed fiber-optic time transfer, comprising a first clock source, a first fiber-optic time transfer unit, N relay and user units, M bidirectional optical amplifying units, a second fiber-optic time transfer unit, and a second clock source. The first clock source is connected to the first fiber-optic time transfer unit through an electrical connection; the first fiber-optic time transfer unit, the N relay and user units, the M bidirectional optical amplifying units, and the second fiber-optic time transfer unit are connected by fiber to form a single-fiber bidirectional series path, the first fiber-optic time transfer unit and the second fiber-optic time transfer unit are respectively located at one and the other end of the single-fiber bidirectional series path, and the order of the N relay and user units and the M bidirectional optical amplifying units on the series path is arbitrary; and the second fiber-optic time transfer unit is connected to the second clock source through an electrical connection;

the timing signal output by the first clock source is transmitted through the first fiber-optic time transfer unit, along the single-fiber bidirectional series path, passes through the optical-electric-optical relay of the N relay and user units, and the optical amplification of the M bidirectional optical amplifying units, and reaches the second fiber-optic time transfer unit; the timing signal of the second clock source is transmitted through the second fiber-optic time transfer unit, along the single-fiber bidirectional series path, passes through the optical-electric-optical relay of the N relay and user units in reverse, and the optical amplification of the M bidirectional optical amplifying units, and reaches the first fiber-optic time transfer unit; the first fiber-optic time transfer unit measures the time interval between the timing signal from the second fiber-optic time transfer unit and the timing signal of the first clock source, and transmits the time interval to the relay and user units and the second fiber-optic time transfer unit through the fiber link; the second fiber-optic time transfer unit measures the time interval between the timing signal from the first fiber-optic time transfer unit and the timing signal of the second clock source, and transmits the time interval to the relay and user units and the first fiber-optic time transfer unit through the fiber link; the first fiber-optic time transfer unit, the set relay and user units, and the second fiber-optic time transfer unit obtain the time difference between the local timing signal of each unit and the timing signal of the first clock source according to the measured time interval information they received, thereby realizing high-precision distributed time transfer.

In the present invention, the first fiber-optic time transfer unit is composed of a first time codec module, a first time interval measurement module, a first optical transceiver module, a first optical switch module, a first bidirectional multiplexing module, and a first control and processing module;

the first time codec module is used to encode the time signal from the first clock source, and the control and status information of the first control and processing module into the timecode, and output it to the first optical transceiver module; the time signal of the first optical transceiver module is decoded, the extracted timing signal is output to the first time interval measurement module, and the measured time interval, and control and state information from the second fiber time transfer unit are extracted and output to the first control and processing module;

the first time interval measurement module receives the timing signal from the first time codec module and the first clock source, and the control signal of the first control and processing module, tests the time interval between the two input timing signals, and output the measured time interval to the first control and processing module;

the first optical transceiver module modulates the timecode output by the first time codec module to an optical signal and sends the signal to the first optical switch module; the first optical transceiver module simultaneously converts the optical signal from the first bidirectional multiplexing module into an electrical signal and sends it to the first time codec module;

the first optical switch module receives the optical signal from the first optical transceiver module, and the control signal of the first control and processing module, and sends the optical signal of the first optical transceiver module to the first bidirectional multiplexing module;

the first bidirectional multiplexing module inputs the optical signal from the first optical switch module into the fiber link, and simultaneously outputs the optical signal from the same fiber link to the first optical transceiver module;

the first control and processing module receives the time interval, control and status information input by the first time codec module, and the time interval input by the first time interval measurement module, and the first control and processing module calculates the clock bias between the first clock source and the second clock source; it sends time coding and decoding control signals, status and control information for access and maintenance of the single-fiber bidirectional series path to the first time codec module; it sends control and configuration information to the first fiber time interval measurement module to control the measurement and reading of the time interval; it sends the control signal to the first optical switch module to control the opening and closing of the optical switch.

In the present invention, the second fiber-optic time transfer unit is composed of a second time codec module, a timing signal adjustment module, a second optical transceiver module, a second optical switch module, a second bidirectional multiplexing module, a second control and processing module, and a second time interval measurement module;

the second time codec module encodes the timing signal from the timing signal adjustment module, the control and status information of the second control and processing module into the timecode, and outputs it to the second optical transceiver module; the time signal of the second optical transceiver module is decoded, and the extracted timing signals are respectively output to the timing signal adjustment module and the second time interval measurement module, the measured time interval, and control and state information from the first fiber-optic time transfer unit are extracted and output to the second control and processing module;

the timing signal adjustment module receives the timing signal from the second time codec module, performs delay adjustment on the timing signal, and outputs the timing signal after the delay adjustment to the second time codec module and the second time interval measurement module respectively;

the second optical transceiver module modulates the timecode output by the second time codec module to an optical signal and sends the signal to the second optical switch module; the second optical transceiver module simultaneously converts the optical signal from the second bidirectional multiplexing module into an electrical signal and sends it to the second time codec module;

the second optical switch module receives the optical signal from the second optical transceiver module, and the control signal of the second control and processing module, and sends the optical signal of the second optical transceiver module to the second bidirectional multiplexing module;

the second bidirectional multiplexing module inputs the optical signal from the second optical switch module into the fiber link, and outputs the optical signal from the same fiber link to the second optical transceiver module;

the second control and processing module receives the time interval, control and status information input by the second time codec module, and the time interval input by the second time interval measurement module, and calculates the clock bias between the first clock source and the second clock source; it sends time coding and decoding control signals to the second time codec module; it sends control and configuration information to the second fiber time interval measurement module to control the measurement and reading of the time interval; it sends the control signal to the second optical switch module to control the opening and closing of the optical switch.

In the present invention, the second time interval measurement module receives the timing signal from the second time codec module and the second clock source, and tests the time interval between the two input timing signals; it also receives the timing signal output by the second time codec module and the timing signal adjustment module, and tests the time interval between the two; it outputs the measured time interval to the second control and processing module; and the relay and user units have three modes of operation:

Mode 1: The relay and user units perform optical-electric-optical relay on the optical signals transmitted forward and backward.

Mode 2: The relay and the user units perform optical-electric-optical relay on the optical signals transmitted forward and backward, and realize synchronization of the timing information of each unit of local clock source with the first clock source;

Mode 3: The relay and the user units perform optical-electric-optical relaying on the optical signals transmitted forward and backward, and output the timing signal synchronized with the first clock source.

The relay and user units working in mode 1 include: a 2×2 optical switch, a photoelectric conversion and signal processing module, an electro-optic conversion module, a decoding module and a control module;

port 1 and port 2 of the 2×2 optical switch are connected to the forward input and backward input of the fiber link respectively, and port 3 and port 4 are connected to the photoelectric conversion and signal processing module and electro-optic conversion module respectively; under the control of the control signal input by the control module, the forward optical signal of the input port 1 of the fiber link is switched to port 3 and output to the photoelectric conversion and signal processing module, and the optical signal input by the electro-optic conversion module to port 4 is output to port 2; under the control of the control signal input by the control module, the backward optical signal of the input port 2 of the fiber link is switched to port 3 and output to the photoelectric conversion and signal processing module, and the optical signal input by the electro-optic conversion module to port 4 is output to port 1;

the photoelectric conversion and signal processing module converts the optical signal from port 3 of the 2×2 optical switch into an electrical signal, which is further processed and input to the electro-optical conversion module and the decoding module;

the electro-optic conversion module converts the electrical signal from the electro-optical conversion and signal processing module into an optical signal, and input it to port 4 of the 2×2 optical switch;

the decoding module receives the timecode input by the photoelectric conversion and signal processing module, decodes it and outputs the information extracted from the timecode to the control module;

the control module receives the information input by the decoding module and outputs a state control signal to the 2×2 optical switch accordingly.

In the present invention, the system for high-precision long-distance distributed fiber-optic time transfer system is characterized in that the relay and user units working in mode 2 include: a 2×2 optical switch, a photoelectric conversion and signal processing module, an electro-optic conversion module, a decoding module, a control module, a time interval measurement module and a local clock source;

port 1 and port 2 of the 2×2 optical switch are connected to the forward input and backward input of the fiber link respectively, and port 3 and port 4 are connected to the photoelectric conversion and signal processing module and electro-optic conversion module respectively; under the control of the control signal input by the control module, the forward optical signal of the input port 1 of the fiber link is switched to port 3 and output to the photoelectric conversion and signal processing module, and the optical signal input by the electro-optic conversion module to port 4 is output to port 2; under the control of the control signal input by the control module, the backward optical signal of the input port 2 of the fiber link is switched to port 3 and output to the photoelectric conversion and signal processing module, and the optical signal input by the electro-optic conversion module to port 4 is output to port 1;

the photoelectric conversion and signal processing module converts the optical signal from port 3 of the 2×2 optical switch into an electrical signal, which is further processed and input to the electro-optical conversion module and the decoding module;

the electro-optic conversion module converts the electrical signal from the electro-optical conversion and signal processing module into an optical signal, and input it to port 4 of the 2×2 optical switch;

the decoding module receives the timecode input by the photoelectric conversion and signal processing module, decodes it, outputs the information extracted from the timecode to the control module, and outputs the extracted timing signal to the time interval measurement module;

the control module receives the information input by the decoding module and the time interval input by the time interval measurement module; according to the received information, it calculates the clock bias between the local clock source and the first clock source, synchronizes the local clock source with the first clock source, outputs the state control signal to the 2×2 optical switch, sends the control and configuration information to the time interval measurement module, and sends the time synchronization control signal to the local clock source (4-7);

the time interval measurement module receives the forward and backward timing signals input by the decoding module and the timing signal input by the local clock source, measures the time interval between the forward and backward timing signals, and the time interval between the forward timing signal and the timing signal of the local clock source; under the control of the control signal input by the control module, the measured time interval is output to the control module;

the local clock source outputs the local timing signal to the time interval measurement module, receives the control signal input by the control module, and outputs the timing signal synchronized with the first clock source.

In the present invention, the relay and user units working in mode 3 include: a 2×2 optical switch, a photoelectric conversion and signal processing module, an electro-optic conversion module, a decoding module, a control module, a time interval measurement module and a timing adjustment module;

port 1 and port 2 of the 2×2 optical switch are connected to the forward input and backward input of the fiber link respectively, and port 3 and port 4 are connected to the photoelectric conversion and signal processing module and electro-optic conversion module respectively; under the control of the control signal input by the control module, the forward optical signal of the input port 1 of the fiber link is switched to port 3 and output to the photoelectric conversion and signal processing module, and the optical signal input by the electro-optic conversion module to port 4 is output to port 2; under the control of the control signal input by the control module, the backward optical signal of the input port 2 of the fiber link is switched to port 3 and output to the photoelectric conversion and signal processing module, and the optical signal input by the electro-optic conversion module to port 4 is output to port 1;

the photoelectric conversion and signal processing module converts the optical signal from port 3 of the 2×2 optical switch into an electrical signal, which is further processed and input to the electro-optical conversion module and the decoding module;

the electro-optic conversion module converts the electrical signal from the electro-optical conversion and signal processing module into an optical signal, and input it to port 4 of the 2×2 optical switch;

the decoding module receives the timecode input by the photoelectric conversion and signal processing module, decodes it, outputs the information extracted from the timecode to the control module, and outputs the extracted timing signal to the time interval measurement module and the timing adjustment module;

the control module receives the information input by the decoding module and the time interval input by the time interval measurement module; according to the received information, it adjusts the timing adjustment module, outputs the timing signal synchronized with the first clock source, outputs the state control signal to the 2×2 optical switch, sends the control and configuration information to the time interval measurement module;

the time interval measurement module receives the forward and backward timing signals input by the decoding module, measures the time interval between the forward and backward timing signals, and outputs the measured time interval to the control module under the control of the control signal input by the control module;

the timing adjustment module receives the control signal input by the control module, performs delay adjustment on the forward timing signal input by the decoding module, and outputs the timing signal synchronized with the first clock source.

On the other hand, the invention also provides a time transfer method for the high-precision long-distance distributed fiber-optic time transfer system, which includes the following steps:

(1) Sequential Synchronization:

When the first fiber-optic time transfer unit detects the local timing signal input by the first clock source, the optical signal transmission is started. The optical signal containing the timecode of local timing signal, control and state information is sent to the single-fiber bidirectional path. The optical signal transmission is closed after the transmission is completed;

the ith (i=1, 2 . . . N) relay and user unit: after startup, the state of the 2×2 optical switch is initialized and maintained as forward transmission. The optical signal from the first fiber-optic time transfer unit is split into two parts after photoelectric conversion and signal processing. One part is decoded to identify the time signal. According to the time $t_{fi}$ at which the time signal is recognized, the next time $t_{fi1}<t_{fi}+T-\tau_{s1}$ at which the 2×2 optical switch is set as forward transmission and the next time $t_{bi1} \geq t_{fi1}+\tau_c+t_{s1}$ at which the 2×2 optical switch is set as backward transmission are determined, where T is the period of the timing signal being transmitted, $\tau_c$ is the length of timecode being transmitted as T, $t_{s1}$ is the switching time of the 2×2 optical switch; When the set time $t_{fi1}$ is reached, the 2×2 optical switch is set and maintained at forward transmission state; when the set time $t_{bi1}$ is reached, the 2×2 optical switch is set and maintained at the backward transmission state. After photoelectric conversion and signal processing, the other part of the forward transmitted signal is converted by electro-optical conversion, output by the 2×2 optical switch, and transmitted to the next unit via the fiber-optic;

the jth (j=1, 2 . . . M) bidirectional optical amplifying unit: Light amplification of the forward optical signal;

the second fiber-optic time transfer unit delays the received timing signal from the first fiber-optic time transfer unit by $\tau_d \geq \tau_c + t_s$, encodes it into the timecode, where $t_s$ is the time when the optical signal transmission is started, and starts the optical signal transmission. The timecode is transmitted to the first fiber-optic time transfer unit through the fiber link, and the optical signal transmission is turner off for the rest of the time;

the ith relay and user unit: performing optical-electric-optical relay on the arrived backward transmitted optical signal;

the jth bidirectional optical amplifying unit: Light amplification of the arrived backward transmitted optical signal;

when the first fiber-optic time transfer unit receives the timecode sent by the second fiber-optic time transfer unit, it is confirmed that the sequential synchronization is successful;

(2) Long-Distance Distributed Fiber-Optic Time Transfer:

(i) When the first fiber-optic time transfer unit detects the local timing signal of the first clock source, the optical signal transmission is started. The local timing signal, the time interval $T_{AB}$ measured locally, and the timecode of the control and state information are transmitted to the second fiber-optic time transfer unit through the fiber link, and the optical signal transmission is turned off after the transmission is completed;

(ii) The ith relay and user unit: At the set forward transmission time $t_{fi1}$, the 2×2 optical switch is set and maintained at forward transmission state, so that the forward transmitted optical signal is transmitted to the next level through the optical-electric-optical relay; meanwhile, according to the time $t_{fi}$ at which the forward transmitted signal is received, the next time $t_{fi1}<t_{fi}+T-t_{s1}$ at which the 2×2 optical switch is set as forward transmission and the next time $t_{bi1} \geq t_{fi1}+\tau_c+t_{s1}$ at which the 2×2 optical switch is set as backward transmission are determined; if the ith relay and the user unit does not receive the forward timing signal beyond the set time threshold, it is restored to its initial state, the 2×2 optical switch is set and maintained at forward transmission state, and the sequential synchronization step is returned;

if the ith relay and user unit works in mode 2 or mode 3, it decodes the forward timing signal and $T_{AB}$ from the forward transmitted signal;

(iii) The jth bidirectional optical amplifying unit: Light amplification of the forward optical signal; if the jth bidirectional optical amplifying unit loses the tracking of the forward timing signal beyond the set time threshold, it is restored to its initial state, and the sequential synchronization step is returned;

(iv) The second fiber-optic time transfer unit extracts the timing signal from the received timecode sent by the first fiber-optic time transfer unit, and measures the difference $T_{BA}$ between the received timing signal transferred by the first fiber-optic time transfer unit and the timing signal of the second fiber-optic time transfer unit; meanwhile, after delaying the received timing signal sent from the first fiber-optic time transfer unit by a fixed time $\tau_d$, the optical signal transmission is started, the time difference $T_{BA}$ and $\tau_d$ are encoded into the timecode, modulated into the same wavelength as the forward transmitted optical signal, and transmitted to the same fiber link. The optical signal transmission is closed after the transmission is completed; if the second fiber-optic time transfer unit does not receive the timing signal sent by the first fiber-optic time transfer unit beyond the set time threshold, it is restored to its initial state, and the sequential synchronization step is returned.

The second fiber-optic time transfer unit calculates the clock bias between the first clock source and the second clock source according to formula (1):

$$\Delta \tau_{12} = \frac{1}{2}[(T_{AB} - 2T_{BA} - \tau_d) + (\tau_A^T - \tau_A^R + \tau_B^R - \tau_B^T)] \quad (0)$$

wherein $\tau_A^T$ and $\tau_B^T$ are the transmission and reception delay of the first fiber-optic time transfer unit, and $\tau_A^R$ and $\tau_B^R$ are the transmission and reception delay of the second fiber-optic time transfer unit, which are obtained by device calibration;

(v) The ith relay and user unit: at the set backward transmission time $t_{bi1}$, the 2×2 optical switch is set and maintained at backward transmission state, so that the backward transmitted optical signal is transmitted to the next level through the optical-electric-optical relay; if the ith relay and the user unit does not receive the backward timing signal beyond the set time threshold, it is restored to its initial state, the 2×2 optical switch is set and maintained at forward transmission state, and the sequential synchronization step is returned;

if the ith relay and user unit works in mode 2, the ith relay and the user unit decodes the backward timing signal from the backward transmitted signal, and inputs it to the time interval measurement module. The time interval measurement module tests the time interval $T_p$ between the backward timing signal and the forward timing signal decoded in step 2, and the time interval $T_{MA}$ between the forward timing signal decoded in step 2 and the timing signal of the local clock source, and calculates the clock bias between the relay and user unit and the first clock source according to formula (2) to realize distributed time transfer, $$\Delta \tau = \frac{1}{2}[(T_{AB} - T_p - 2T_{MA}) + (\tau_A^T + \tau_M^R - \tau_M^T - \tau_A^R)] \quad (0)$$

wherein $\tau_A^T$ and $\tau_A^R$ are the transmission and reception delay of the first fiber-optic time transfer unit, which can be obtained by device calibration; $\tau_M^T$ and $\tau_M^R$ are the transmission and reception delay of the ith relay and user unit, which can be obtained by device calibration;

if the ith relay and user unit works in mode 3, it decodes the backward timing signal from the backward transmitted signal, and inputs it to the time interval measurement module; the time interval $T_p$ between the forward and backward timing signals decoded in step 2 is tested; calculating the clock bias between the forward timing signal received by the ith relay and user unit and the timing signal of the first clock source according to formula (3), adjusting and outputting the forward timing signal through the timing signal adjustment module to realize distributed time transmission, $$\Delta \tau = \frac{1}{2}[(T_{AB} - T_p) + (\tau_A^T + \tau_M^R - \tau_M^T - \tau_A^R)] \quad (0)$$

wherein $\tau_A^T$ and $\tau_A^R$ are the transmission and reception delay of the first fiber-optic time transfer unit, which can be obtained by device calibration; $\tau_M^T$ and $\tau_M^R$ are the transmission and reception delay of the ith relay and user unit, which can be obtained by device calibration;

(vi) The jth bidirectional optical amplifying unit: Light amplification of the backward optical signal; if the jth bidirectional optical amplifying unit loses the tracking of the backward timing signal beyond the set time threshold, it is restored to its initial state, and the sequential synchronization step is returned.

(vii) The first fiber-optic time transfer unit receives the timecode from the second fiber-optic time transfer unit, decodes the timing signal, $T_{BA}$ and $\tau_d$ from the timecode, measures the time difference $T_{AB}$ between the decoded timing signal and the local timing signal of the first clock source sent in step 1, and returns to step (i); if the first fiber-optic time transfer unit does not receive the timing signal sent by the second fiber-optic time transfer unit beyond the set time threshold, it is restored to its initial state, and the sequential synchronization step is returned;

the first fiber-optic time transfer unit calculates the clock bias between the first clock source and the second clock source according to formula (4):

$$\Delta \tau_{12} = \frac{1}{2}[(T_{AB} - 2T_{BA} - \tau_d) + (\tau_A^T - \tau_A^R + \tau_B^R - \tau_B^T)] \quad (0)$$

wherein $\tau_A^T$ and $\tau_A^R$ are the transmission and reception delay of the first fiber-optic time transfer unit, which can be obtained by device calibration; $\tau_B^T$ and $\tau_B^R$ are the transmission and reception delay of the second fiber-optic time transfer unit, which can be obtained by device calibration.

Compared with the prior art, the beneficial effects of the present invention are:

Based on mature technology, the bidirectional time signals are passed through the same link to ensure maximum symmetry of the main link bidirectional delay; the effect of multiple optical amplifications of noise such as Rayleigh scattering on the stability of the fiber-optic time transfer is effectively avoided by the optical-electric-optical process; the distributed time transfer is realized by the bidirectional timing signal time interval received by the relay and user units.

DETAILED DESCRIPTIONS OF INVENTION AND EMBODIMENTS

An embodiment of the present invention is hereunder provided in combination with figures. The embodiment provides a detailed implementation of the present invention and a specific workflow, but the extent of protection of the present invention is not limited to the embodiment described below.

Figure 1:
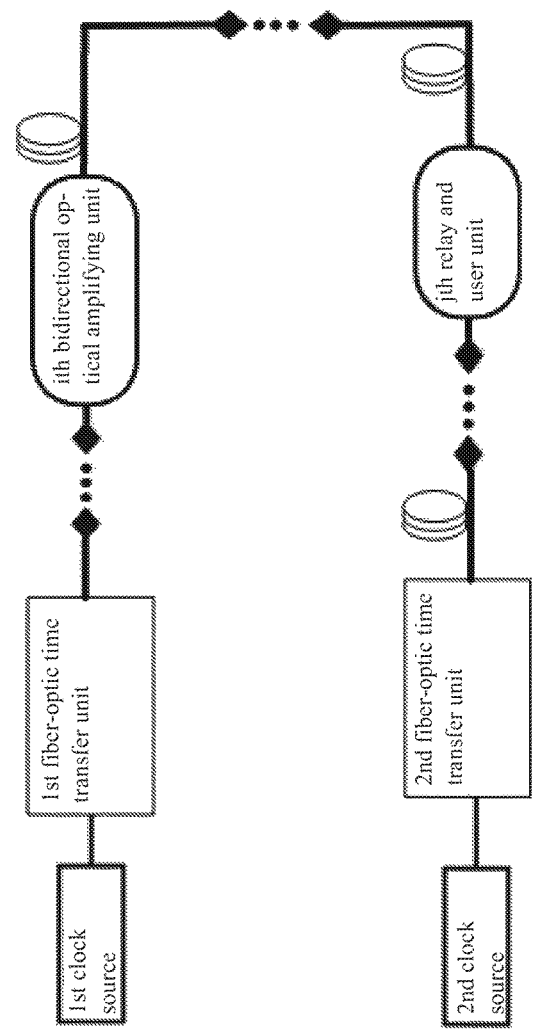
FIG. 1 is a structural diagram showing an embodiment of the system and method of the present invention.

In the embodiment of the present invention, as shown in FIG. 1, the system for high-precision long-distance distributed fiber-optic time transfer comprises a first clock source, a first fiber-optic time transfer unit 1, N relay and user units, M bidirectional optical amplifying units, a second fiber-optic time transfer unit 2 and a second clock source. The first clock source is connected to the first fiber-optic time transfer unit through an electrical connection; the first fiber-optic time transfer unit, the N relay and user units, the M bidirectional optical amplifying units, and the second fiber-optic time transfer unit are connected by fiber to form a single-fiber bidirectional series path, the first fiber-optic time transfer unit and the second fiber-optic time transfer unit are respectively located at one and the other end of the single-fiber bidirectional series path, and the order of the N relay and user units and the M bidirectional optical amplifying units on the series path is arbitrary; the second fiber-optic time transfer unit is connected to the second clock source through an electrical connection; the M bidirectional optical amplifying unit uses a bidirectional optical amplifier including a 2×2 optical switch and a unidirectional optical amplifier (see CN201610073321.3, which is incorporated herein by reference). The transmission direction from the first fiber-optic time transfer unit to the second fiber-optic time transfer unit is forward; the transmission direction from the second fiber-optic time transfer unit to the first fiber-optic time transfer unit is backward. The forward and backward optical signals are time-divisionally transmitted via the fiber link. The transmitted timing signal is 1PPS and the length of the timecode is about 6 μs. In the embodiment, the sending and closing of optical signals in the first fiber-optic time transfer unit and the second fiber-optic time transfer unit are respectively controlled by a 1×1 mechanical optical switch with a maximum response time of 1 ms as shown in FIGS. 2 and 3.

Figure 4:
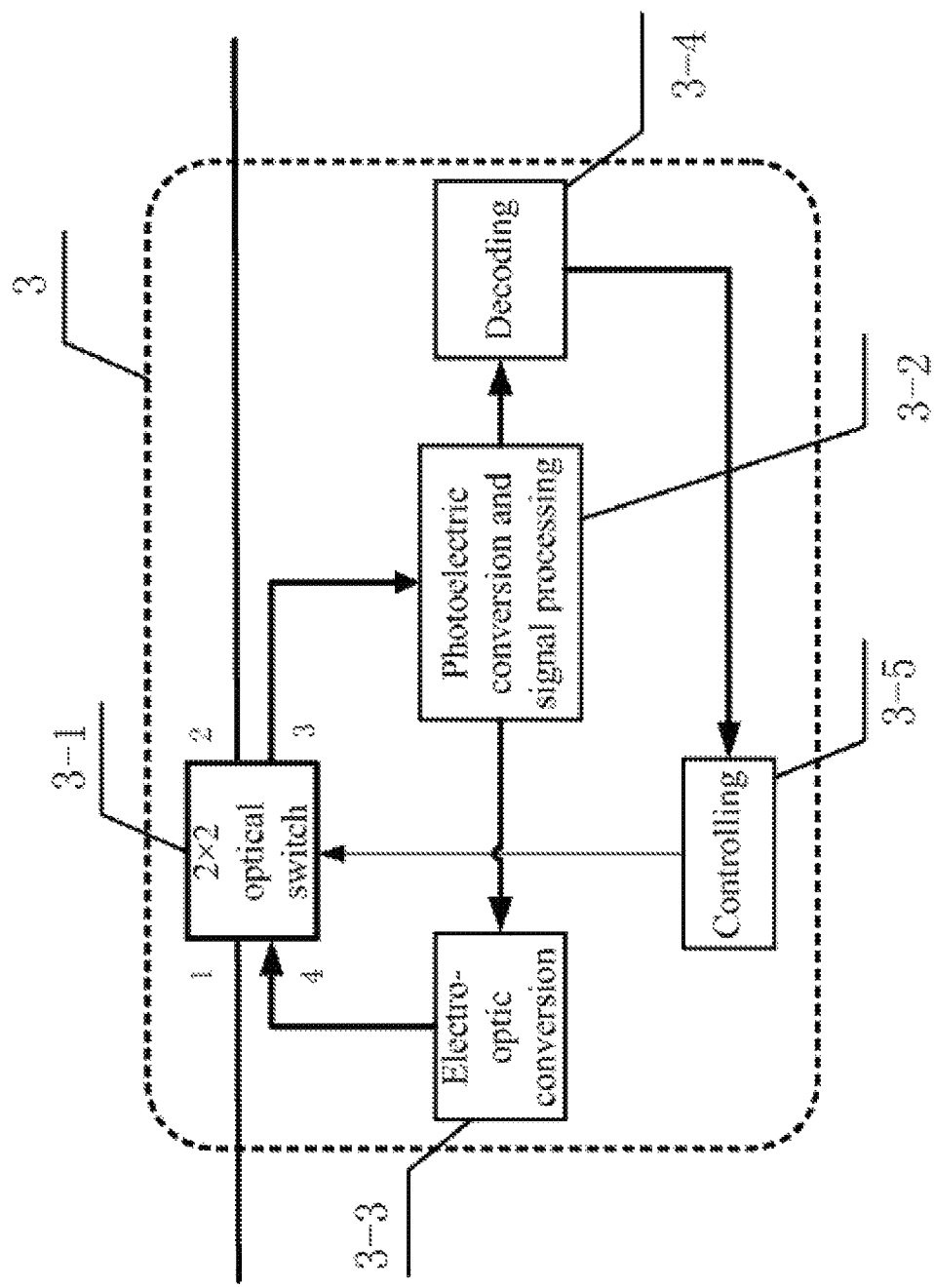
FIG. 4 is a structural diagram showing the relay and user unit of mode 1 in one embodiment of the present invention.
Figure 5:
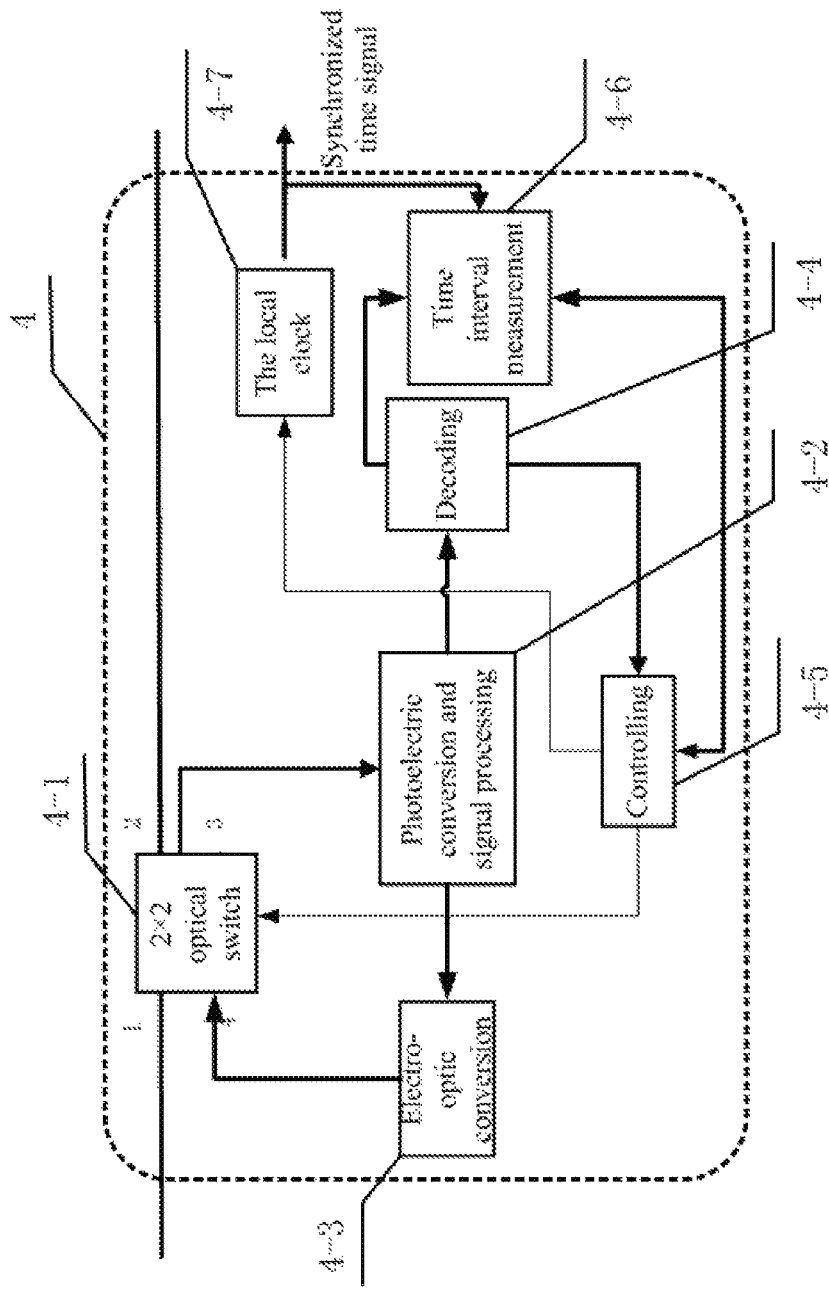
FIG. 5 is a structural diagram showing the relay and user unit of mode 2 in one embodiment of the present invention.
Figure 6:
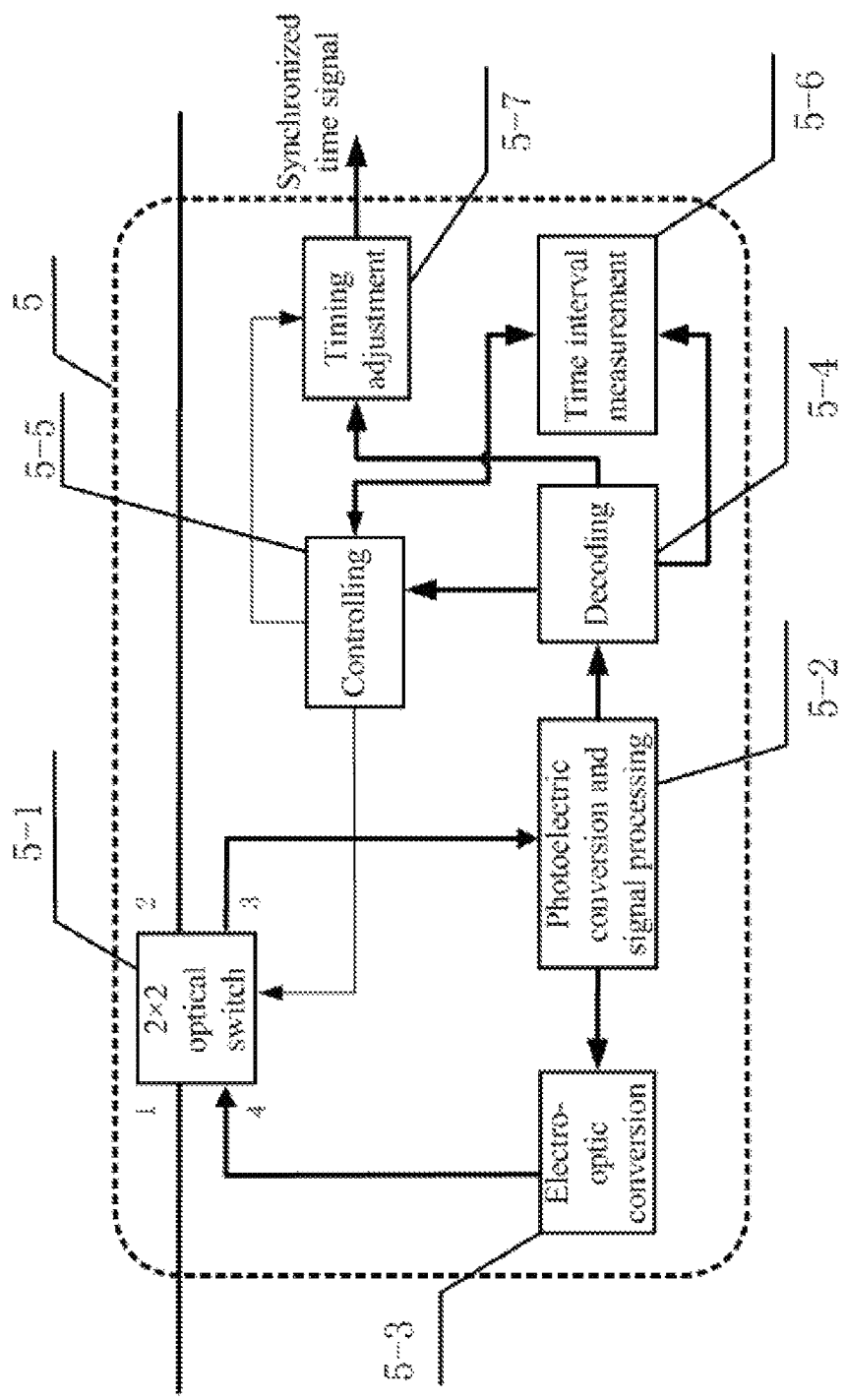
FIG. 6 is a structural diagram of the relay and user unit (mode 3) in one embodiment of the present invention.

The 2×2 optical switch of the relay and user unit uses a mechanical optical switch with switching time of 1 ms as shown in FIGS. 4, 5, and 6, the forward transmission state of the relay and user unit means that port 1 and port 3, port 2 and port 4 of the 2×2 optical switch are in a connected state, and the backward transmission state of the relay and user unit means that port 1 and port 4, port 2 and port 3 of the 2×2 optical switch are in a connected state.

Figure 2:
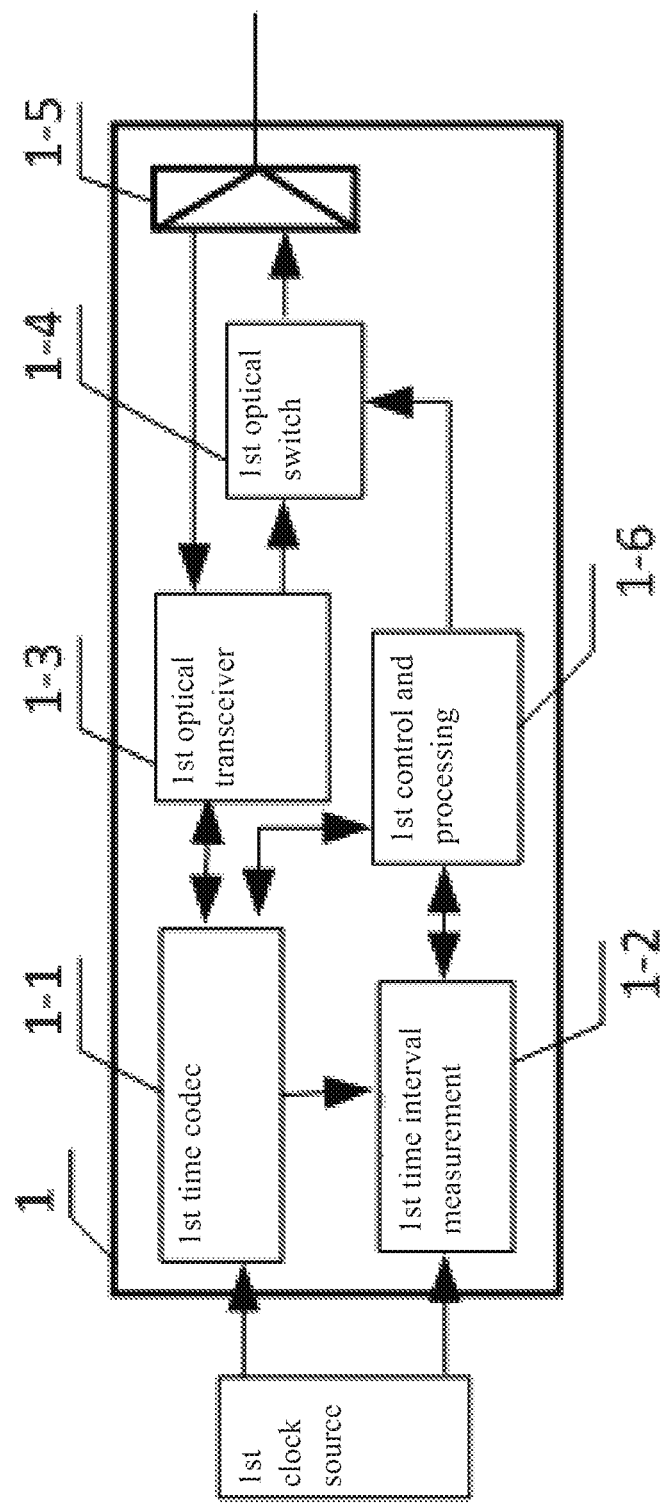
FIG. 2 is a structural diagram showing the first fiber-optic time transfer unit in one embodiment of the present invention.
Figure 3:
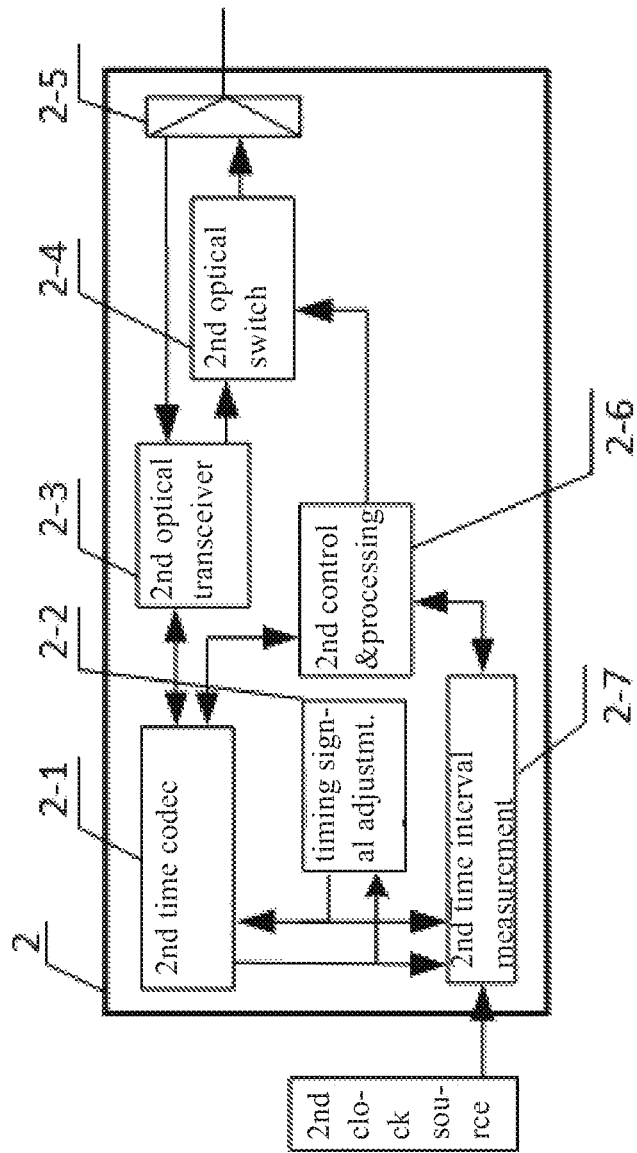
FIG. 3 is a structural diagram showing the second fiber-optic time transfer unit in one embodiment of the present invention.

As shown in FIG. 2, the first fiber-optic time transfer unit 1 is composed of a first time codec module 1-1, a first time interval measurement module 1-2, a first optical transceiver module 1-3, a first optical switch module 1-4, a first bidirectional multiplexing module 1-5, and a first control and processing module 1-6;

The first time codec module 1-1 encodes the time signal from the first clock source, and the control and status information of the first control and processing module 1-6 into the timecode, and outputs it to the first optical transceiver module 1-3; the time signal of the first optical transceiver module 1-3 is decoded, the extracted timing signal is output to the first time interval measurement module 1-2, and the measured time interval, and control and state information from the second fiber time transfer unit are extracted and output to the first control and processing module 1-6;

The first time interval measurement module 1-2 receives the timing signal from the first time codec module 1-1 and the first clock source, and the control signal of the first control and processing module 1-6, tests the time interval between the two input timing signals, and output the measured time interval to the first control and processing module 1-6;

The first optical transceiver module 1-3 modulates the timecode output by the first time codec module 1-1 to an optical signal and sends the signal to the first optical switch module 1-4; the first optical transceiver module 1-3 simultaneously converts the optical signal from the first bidirectional multiplexing module 1-5 into an electrical signal and sends it to the first time codec module 1-1;

The first optical switch module 1-4 receives the optical signal from the first optical transceiver module 1-3, and the control signal of the first control and processing module 1-6, and sends the optical signal of the first optical transceiver module 1-3 to the first bidirectional multiplexing module 1-5;

The first bidirectional multiplexing module 1-5 inputs the optical signal from the first optical switch module 1-4 into the single-fiber bidirectional series path, and simultaneously outputs the optical signal from the same single-fiber bidirectional series path to the first optical transceiver module 1-3;

The first control and processing module 1-6 receives the time interval, control and status information input by the first time codec module 1-1, and the time interval input by the first time interval measurement module 1-2, and the first control and processing module calculates the clock bias between the first clock source and the second clock source; it sends time coding and decoding control signals, status and control information for access and maintenance of the fiber link to the first time codec module 1-1; it sends control and configuration information to the first fiber time interval measurement module 1-2 to control the measurement and reading of the time interval; it sends the control signal to the first optical switch module 1-4 to control the opening and closing of the optical switch.

As shown in FIG. 3, the second fiber-optic time transfer unit is composed of a second time codec module 2-1, a timing signal adjustment module 2-2, a second optical transceiver module 2-3, a second optical switch module 2-4, a second bidirectional multiplexing module 2-5, a second control and processing module 2-6, and a second time interval measurement module 2-7;

The second time codec module 2-1 encodes the timing signal from the timing signal adjustment module 2-2, the control and status information of the second control and processing module 2-6 into the timecode, and outputs it to the second optical transceiver module 2-3; the time signal of the second optical transceiver module 2-3 is decoded, and the extracted timing signals are respectively output to the timing signal adjustment module 2-2 and the second time interval measurement module 2-7, the measured time interval, and control and state information from the first-optic fiber time transfer unit are extracted and output to the second control and processing module 2-6;

The timing signal adjustment module 2-2 receives the timing signal from the second time codec module 2-1, performs delay adjustment on the timing signal, and outputs the timing signal after the delay adjustment to the second time codec module 2-1 and the second time interval measurement module 2-7 respectively;

The second optical transceiver module 2-3 modulates the timecode output by the second time codec module 2-1 to an optical signal and sends the signal to the second optical switch module 2-4; the second optical transceiver module 2-3 simultaneously converts the optical signal from the second bidirectional multiplexing module 2-5 into an electrical signal and sends it to the second time codec module 2-1;

The second optical switch module 2-4 receives the optical signal from the second optical transceiver module 2-3, and the control signal of the second control and processing module 2-6, and sends the optical signal of the second optical transceiver module 2-3 to the second bidirectional multiplexing module 2-5;

The second bidirectional multiplexing module 2-5 inputs the optical signal from the second optical switch module 2-4 into the fiber link, and outputs the optical signal from the same fiber link to the second optical transceiver module 2-3;

The second control and processing module 2-6 receives the time interval, control and status information input by the second time codec module 2-1, and the time interval input by the second time interval measurement module 2-7, and the second control and processing module calculates the clock bias between the first clock source and the second clock source; it sends time coding and decoding control signals to the second time codec module 2-1; it sends control and configuration information to the second fiber time interval measurement module 2-7 to control the measurement and reading of the time interval; it sends the control signal to the second optical switch module 2-4 to control the opening and closing of the optical switch.

The second time interval measurement module 2-7 receives the timing signal from the second time codec module 2-1 and the second clock source, and tests the time interval between the two input timing signals; it also receives the timing signal output by the second time codec module 2-1 and the timing signal adjustment module 2-2, and tests the time interval between the two; it outputs the measured time interval to the second control and processing module 2-6.

The relay and user units have three modes of operation:

Mode 1: the relay and user units perform optical-electric-optical relay on the optical signals transmitted forward and backward; as shown in FIG. 4, the relay and user units working in mode 1 include a 2×2 optical switch 3-1, a photoelectric conversion and signal processing module 3-2, an electro-optic conversion module 3-3, a decoding module 3-4 and a control module 3-5;

port 1 and port 2 of the 2×2 optical switch 3-1 are connected to the forward input and backward input of the fiber link respectively, and port 3 and port 4 are connected to the photoelectric conversion and signal processing module 3-2 and electro-optic conversion module 3-3 respectively; under the control of the control signal input by the control module 3-5, the forward optical signal of the input port 1 of the fiber link is switched to port 3 and output to the photoelectric conversion and signal processing module 3-2, and the optical signal input by the electro-optic conversion module 3-3 to port 4 is output to port 2; under the control of the control signal input by the control module 3-5, the backward optical signal of the input port 2 of the fiber link is switched to port 3 and output to the photoelectric conversion and signal processing module 3-2, and the optical signal input by the electro-optic conversion module 3-3 to port 4 is output to port 1;

the photoelectric conversion and signal processing module 3-2 converts the optical signal from port 3 of the 2×2 optical switch 3-1 into an electrical signal, which is further processed and input to the electro-optical conversion module 3-3 and the decoding module 3-4;

the electro-optic conversion module 3-3 converts the electrical signal from the electro-optical conversion and signal processing module 3-2 into an optical signal, and input it to port 4 of the 2×2 optical switch 3-1;

the decoding module 3-4 receives the timecode input by the photoelectric conversion and signal processing module 3-2, decodes it and outputs the information extracted from the timecode to the control module 3-5;

the control module 3-5 receives the information input by the decoding module 3-4 and outputs a state control signal to the 2×2 optical switch 3-1 accordingly.

Mode 2: the relay and the user units perform optical-electric-optical relay on the optical signals transmitted forward and backward, and realize synchronization of the timing information of each unit of local clock source with the first clock source; as shown in FIG. 5, the relay and user units working in mode 2 include: a 2×2 optical switch 4-1, a photoelectric conversion and signal processing module 4-2, an electro-optic conversion module 4-3, a decoding module 4-4, a control module 4-5, a time interval measurement module 4-6 and a local clock source 4-7;

port 1 and port 2 of the 2×2 optical switch 4-1 are connected to the forward input and backward input of the fiber link respectively, and port 3 and port 4 are connected to the photoelectric conversion and signal processing module 4-2 and electro-optic conversion module 4-3 respectively; under the control of the control signal input by the control module 4-5, the forward optical signal of the input port 1 of the fiber link is switched to port 3 and output to the photoelectric conversion and signal processing module 4-2, and the optical signal input by the electro-optic conversion module 4-3 to port 4 is output to port 2; under the control of the control signal input by the control module 4-5, the backward optical signal of the input port 2 of the fiber link is switched to port 3 and output to the photoelectric conversion and signal processing module 4-2, and the optical signal input by the electro-optic conversion module 4-3 to port 4 is output to port 1;

the photoelectric conversion and signal processing module 4-2 converts the optical signal from port 3 of the 2×2 optical switch 4-1 into an electrical signal, which is further processed and input to the electro-optical conversion module 4-3 and the decoding module 4-4;

the electro-optic conversion module 4-3 converts the electrical signal from the electro-optical conversion and signal processing module 4-2 into an optical signal, and input it to port 4 of the 2×2 optical switch 4-1;

the decoding module 4-4 receives the timecode input by the photoelectric conversion and signal processing module 4-2, decodes it, outputs the information extracted from the timecode to the control module 4-5, and outputs the extracted timing signal to the time interval measurement module 4-6;

the control module 4-5 receives the information input by the decoding module 4-4 and the time interval input by the time interval measurement module 4-6; According to the received information, it calculates the clock bias between the local clock source 4-7 and the first clock source, synchronizes the local clock source with the first clock source, outputs the state control signal to the 2×2 optical switch 4-1, sends the control and configuration information to the time interval measurement module 4-6, and sends the time synchronization control signal to the local clock source 4-7;

the time interval measurement module 4-6 receives the forward and backward timing signals input by the decoding module 4-4 and the timing signal input by the local clock source 4-7, measures the time interval between the forward and backward timing signals, and the time interval between the forward timing signal and the timing signal of the local clock source 4-7; Under the control of the control signal input by the control module 4-5, the measured time interval is output to the control module 4-5;

the local clock source 4-7 outputs the local timing signal to the time interval measurement module 4-6, receives the control signal input by the control module 4-5, and outputs the timing signal synchronized with the first clock source.

Mode 3: the relay and the user units perform optical-electric-optical relaying on the optical signals transmitted forward and backward, and output the timing signal synchronized with the first clock source; as shown in FIG. 6, the relay and user units working in mode 3 include: a 2×2 optical switch 5-1, a photoelectric conversion and signal processing module 5-2, an electro-optic conversion module 5-3, a decoding module 5-4, a control module 5-5, a time interval measurement module 5-6 and a timing adjustment module 5-7;

port 1 and port 2 of the 2×2 optical switch 5-1 are connected to the forward input and backward input of the fiber link respectively, and port 3 and port 4 are connected to the photoelectric conversion and signal processing module 5-2 and electro-optic conversion module 5-3 respectively; under the control of the control signal input by the control module 5-5, the forward optical signal of the input port 1 of the fiber link is switched to port 3 and output to the photoelectric conversion and signal processing module 5-2, and the optical signal input by the electro-optic conversion module 5-3 to port 4 is output to port 2; under the control of the control signal input by the control module 5-5, the backward optical signal of the input port 2 of the fiber link is switched to port 3 and output to the photoelectric conversion and signal processing module 5-2, and the optical signal input by the electro-optic conversion module 5-3 to port 4 is output to port 1;

the photoelectric conversion and signal processing module 5-2 converts the optical signal from port 3 of the 2×2 optical switch 5-1 into an electrical signal, which is further processed and input to the electro-optical conversion module 5-3 and the decoding module 5-4;

the electro-optic conversion module 5-3 converts the electrical signal from the electro-optical conversion and signal processing module 5-2 into an optical signal, and input it to port 4 of the 2×2 optical switch 5-1;

the decoding module 5-4 receives the timecode input by the photoelectric conversion and signal processing module 5-2, decodes it, outputs the information extracted from the timecode to the control module 5-5, and outputs the extracted timing signal to the time interval measurement module 5-6 and the timing adjustment module 5-7;

the control module 5-5 receives the information input by the decoding module 5-4 and the time interval input by the time interval measurement module 5-6; according to the received information, it adjusts the timing adjustment module 5-7, outputs the timing signal synchronized with the first clock source, outputs the state control signal to the 2×2 optical switch 5-1, sends the control and configuration information to the time interval measurement module 5-6;

the time interval measurement module 5-6 receives the forward and backward timing signals input by the decoding module 5-4, measures the time interval between the forward and backward timing signals, and outputs the measured time interval to the control module 5-5 under the control of the control signal input by the control module 5-5;

the timing adjustment module 5-7 receives the control signal input by the control module 5-5, performs delay adjustment on the forward timing signal input by the decoding module 5-4, and outputs the timing signal synchronized with the first clock source.

The method for the high-precision long-distance distributed fiber-optic time transfer of the present invention includes sequential synchronization process and long-distance distributed fiber-optic timing transmission process. The sequential synchronization process is used to realize sequential configuration of each unit in the fiber-optic time transfer system and the transmission over a single fiber with the same wave transmission based on bidirectional time-division multiplexing. Long-distance distributed fiber-optic timing transmission process realizes time synchronization of the second clock source, the relay and user units and the first clock source through the transmission over a single fiber with the same wave transmission based on bidirectional time-division multiplexing.

(1) Sequential Synchronization Includes:

The first fiber-optic time transfer unit determines the next time $t_{m11}<t_1+0.999$ to open the optical switch according to the time $t_{m1}$ at which the local 1PPS of the first clock source is detected and the maximum response time of switching by the optical switch is 1 ms. When time $t_{m11}$ is reached, the first fiber-optic time transfer unit opens the optical switch, encodes the local 1PPS into the timecode, and sends the timecode to the second fiber-optic time transfer unit through the fiber link. The optical switch is closed after the transmission of the timecode is completed.

The ith (i=1, 2 ... N) relay and user unit: after startup, the state of the 2×2 optical switch is initialized and maintained as forward transmission. The forward transmitted optical signal reaches the ith relay and user unit, passes through the port 1 and port 3 of the 2×2 optical switch in turn, and is split into two parts after the photoelectric conversion and signal processing module. The decoding module decodes one part of the timing signal to obtain the timing signal, and the control module determines the next time $t_{fi1}$ $t_{fi}+0.999$ at which the 2×2 optical switch is set as forward transmission and the next time $t_{bi1} \geq t_{fi1}+0.001006$ at which the 2×2 optical switch is set as backward transmission according to the time $t_{fi}$ at which the time signal is decoded. When the set time $t_{fi1}$ is reached, the 2×2 optical switch is set and maintained at forward transmission state; when the set time $t_{bi1}$ is reached, the 2×2 optical switch is set and maintained at the backward transmission state. The other part of the signal output by the photoelectric conversion and signal processing module passes through the electro-optical conversion module, the port 4 and the port 2 of the 2×2 optical switch, and the fiber link and enters the next level.

The jth (j=1, 2 ... M) bidirectional optical amplifying unit: according to the time which the timecode sent by the first fiber-optic time transfer unit is detected, the next time $t_{fj1}=t_{fj}+0.9$ to switch the state of 2×2 optical switch so that the internal transmission direction is forward transmission is determined. When the set time $t_{fj1}$ is reached, the internal transmission direction of the jth bidirectional optical amplification unit is set and maintained as forward transmission, so that the timecode sent by the first fiber-optic time transmission unit after optical amplification can enter the next level through the fiber link.

The second fiber-optic time transfer unit delays the received 1PPS from the first fiber-optic time transfer unit by 10 ms, encodes it into the timecode, and transmits the timecode to the first fiber-optic time transfer unit through the fiber link. 5 ms after the second fiber-optic time transfer unit receives 1 PPS from the first fiber-optic time transfer unit, the 1×1 optical switch is opened and closed after the transmission of the timecode is completed;

the backward transmitted optical signal reaching the ith relay and user unit passes through the port 2 and port 3 of the 2×2 optical switch, the photoelectric conversion module, the electro-optical conversion module, the port 4 and port 1 of the 2×2 optical switch, and the fiber link in turn and enters the next level.

The jth bidirectional optical amplifying unit: According to the time $t_{bj}$ at which the timecode sent by the second fiber-optic time transfer unit is detected, the next time $t_{bj1}=t_{bj}+0.9$ to switch the state of 2×2 optical switch so that the internal transmission direction is backward transmission is determined; when the set time $t_{bj1}$ is reached, the internal transmission direction of the jth bidirectional optical amplification unit is set and maintained as backward transmission, so that the timecode sent by the second fiber-optic time transmission unit after optical amplification can enter the next level through the fiber link;

when the first fiber-optic time transfer unit receives the timecode sent by the second fiber-optic time transfer unit, it is confirmed that the sequential synchronization is successful, and enters the long-distance distributed optical fiber time transfer state.

Figure 7:
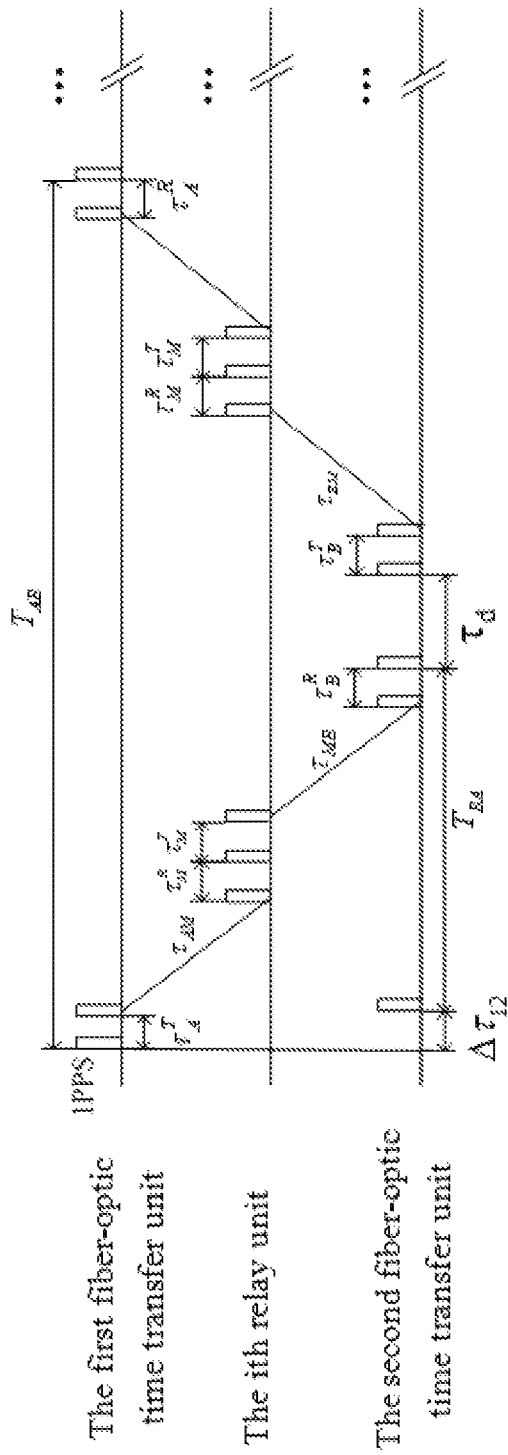
FIG. 7 is a sequence diagram showing an embodiment of a relay and user unit mode 1 of the present invention.

(2) Long-distance distributed fiber-optic time transfer, the specific steps thereof are as follows and shown in FIG. 7:

(i) The first fiber-optic time transfer unit determines the next time $t_{m11}<t_{m1}+0.999$ to open the optical switch according to the time $t_{m1}$ at which the local 1PPS of the first clock source is detected. When time $t_{m11}$ is reached, the first fiber-optic time transfer unit opens the optical switch, encodes the local 1PPS into the timecode, and sends the timecode to the second fiber-optic time transfer unit through the fiber link. The optical switch is closed after the transmission of the timecode is completed.

Figure 8:
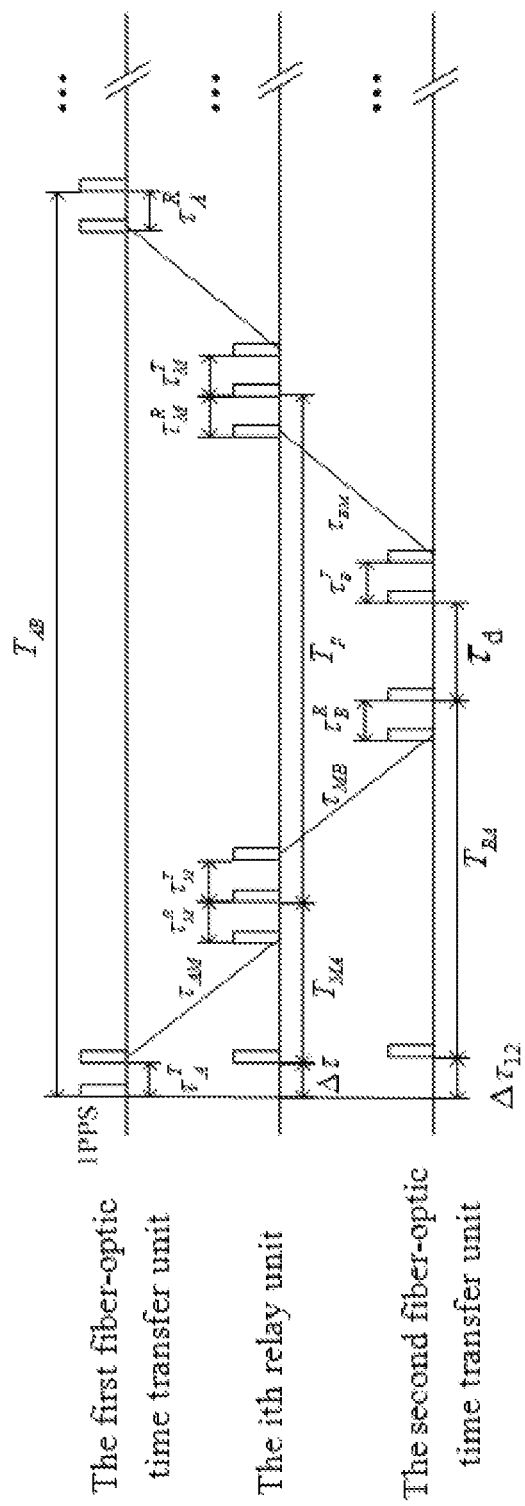
FIG. 8 is a sequence diagram showing an embodiment of a relay and user unit mode 2 of the present invention.
Figure 9:
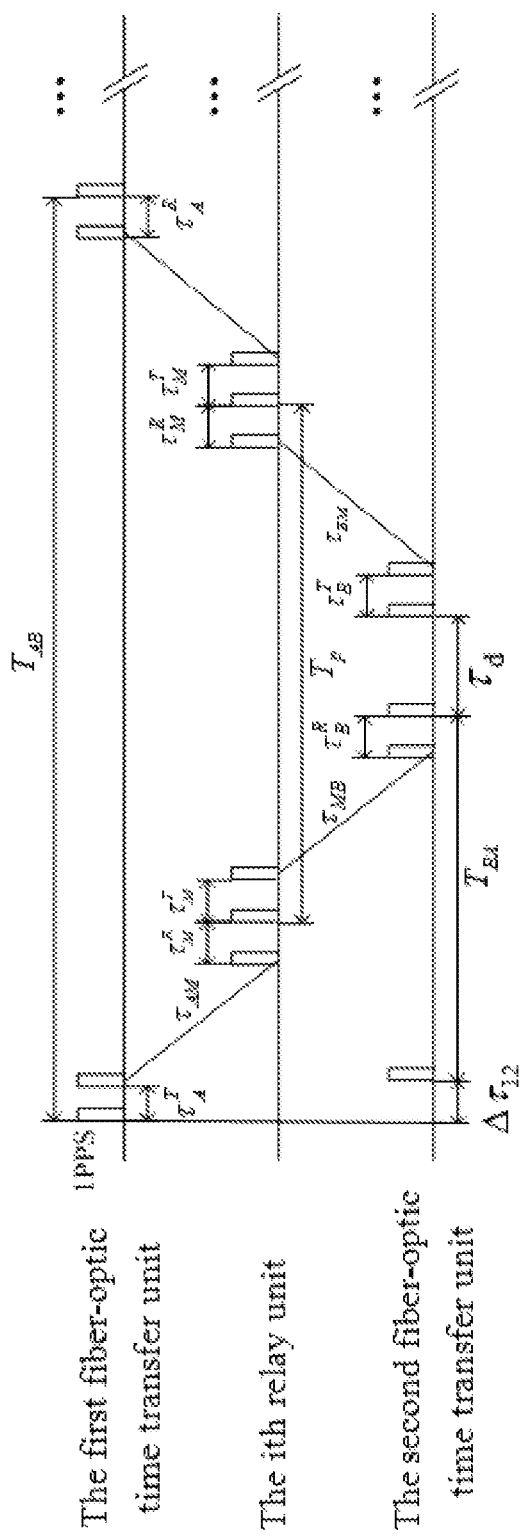
FIG. 9 is a sequence diagram showing an embodiment of a relay and user unit mode 3 of the present invention.

(ii) The ith relay and user unit: The forward transmitted optical signal passes through the port 1 and port 3 of the 2×2 optical switch in turn, and is split into two parts in the photoelectric conversion and amplification module. One part passes through the decoding module and enters the control module, the control module determines the next time $t_{fi1}=t_{fi}+0.999$ at which the 2×2 optical switch is set as forward transmission and the next time $t_{bi1} \geq t_{fi1}+0.001006$ at which the 2×2 optical switch is set as backward transmission according to the time $t_{fi}$. At the set time $t_{fi1}$, the 2×2 optical switch is set and maintained at forward transmission state, so that the forward signal of the other part carrying the timing signal passes through the photoelectric conversion and signal processing module, and then passes through the electro-optic conversion module, port 4 and port 2 of the 2×2 optical switch in turn and enters the next level. At the set time $t_{fi1}$, the 2×2 optical switch is set and maintained at backward transmission state. If the ith relay and the user unit does not receive the forward timing signal beyond the set time threshold (such as 100 s), it is restored to its initial state, the 2×2 optical switch is set and maintained at forward transmission state, and the sequential synchronization step is returned;

if the ith relay and user unit works in mode 2, as shown in FIG. 8, or mode 3, as shown in FIG. 9, it decodes the forward timing signal and $T_{AB}$ from the forward transmitted signal, and inputs the decoded forward timing signal into the time interval measurement module.

(iii) The jth bidirectional optical amplifying unit: according to the time $t_{fj}$ at which the timecode sent by the first fiber-optic time transfer unit is detected, the next time $t_{fj1}=t_{fj}+0.9$ to switch the state of 2×2 optical switch so that the internal transmission direction is forward transmission is determined. When the set time $t_{fj1}$ is reached, the internal transmission direction of the jth bidirectional optical amplification unit is set and maintained as forward transmission, so that the timecode sent by the first fiber-optic time transmission unit after optical amplification can enter the next level through the fiber link. If the jth bidirectional optical amplifying unit loses the tracking of the forward timing signal beyond the set time threshold (such as 100 s), it is restored to its initial state, and the sequential synchronization step is returned.

(iv) After detecting the 1PPS sent from the first fiber-optic time transfer unit, the second fiber-optic time transfer unit measures the difference $T_{BA}$ between the local 1PPS and the received 1PPS sent from the first fiber-optic time transfer unit, and delays the received 1PPS sent from the first fiber-optic time transfer unit by about 10 ms. The delayed 1PPS, the locally measured time difference $T_{BA}$ and $\tau_d$ are encoded into the timecode and modulated into the same wavelength as the forward transmitted optical signal. And the timecode is transmitted to the first fiber-optic time transfer unit through the fiber link; 5 ms after the second fiber-optic time transfer unit receives 1 PPS from the first fiber-optic time transfer unit, the 1×1 optical switch is opened and closed after the transmission of the timecode is completed; if the second fiber-optic time transfer unit does not receive the timing signal sent by the first fiber-optic time transfer unit beyond the set time threshold (such as 100 s), it is restored to its initial state, and the sequential synchronization step is returned;

the second fiber-optic time transfer unit calculates the clock bias between the first clock source and the second clock source according to formula (9):

$$\Delta \tau_{12} = \frac{1}{2}[(T_{AB} - 2T_{BA} - \tau_d) + (\tau_A^T - \tau_A^R + \tau_B^R - \tau_B^T)] \qquad (0)$$

where $\tau_A^T$ and $\tau_A^R$ are the transmission and reception delay of the first fiber-optic time transfer unit, which can be obtained by device calibration; $\tau_B^T$ and $\tau_B^R$ are the transmission and reception delay of the second fiber-optic time transfer unit, which can be obtained by device calibration.

(v) The ith relay and user unit: At the set backward transmission time $t_{bi1}$, the 2×2 optical switch is set and maintained at backward transmission state, so that the backward transmitted optical signal is transmitted to the next level through the optical-electric-optical relay; if the ith relay and the user unit does not receive the backward timing signal beyond the set time threshold, it is restored to its initial state, the 2×2 optical switch is set and maintained at forward transmission state, and the sequential synchronization step is returned;

if the ith relay and user unit works in mode 2, as shown in FIG. 8, it decodes the backward timing signal from the backward transmitted signal, and inputs it to the time interval measurement module to test the time interval between the forward timing signal and the backward timing signal, and the time interval between the forward timing signal and the timing signal of the local clock source. The clock bias between the local clock source of the relay and user unit and the first clock source is calculated according to formula (10) to realize distributed time transfer:

$$\Delta\tau = \frac{1}{2}[(T_{AB} - T_p - 2T_{MA}) + (\tau_A^T + \tau_M^R - \tau_M^T - \tau_A^R)] \quad (0)$$

where $T_p$ is the time interval between the forward timing signal and the backward timing signal; $T_{MA}$ is the time interval between the forward timing signal and the timing signal of the local clock source; $\tau_A^T$ and $\tau_A^R$ are the transmission and reception delay of the first fiber-optic time transfer unit, which can be obtained by device calibration; $\tau_M^T$ and $\tau_M^R$ are the transmission and reception delay of the ith relay and user unit, which can be obtained by device calibration;

if the ith relay and user unit works in mode 3, as shown in FIG. 9, it decodes the backward timing signal from the backward transmitted signal, and inputs it to the time interval measurement module; the time interval between the forward and backward timing signals is tested; calculating the clock bias between the ith relay and user unit and the timing signal of the first clock source according to formula (11), adjusting and outputting the forward timing signal through the timing signal adjustment module to realize distributed time transmission.

$$\Delta\tau = \frac{1}{2}[(T_{AB} - T_p) + (\tau_A^T + \tau_M^R - \tau_M^T - \tau_A^R)] \quad (0)$$

where $T_p$ is the time interval between the forward timing signal and the backward timing signal; $\tau_A^T$ and $\tau_A^R$ are the transmission and reception delay of the first fiber-optic time transfer unit, which can be obtained by device calibration; $\tau_M^T$ and $\tau_M^R$ are the transmission and reception delay of the ith relay and user unit, which can be obtained by device calibration.

(vi) The jth bidirectional optical amplifying unit: according to the time $t_{bj}$ at which the timecode sent by the second fiber-optic time transfer unit is detected, the next time $t_{bj1}=t_{bj}+0.9$ to switch the state of 2×2 optical switch so that the internal transmission direction is backward transmission is determined; when the set time $t_{bj1}$ is reached, the internal transmission direction of the jth bidirectional optical amplification unit is set and maintained as backward transmission, so that the timecode sent by the second fiber-optic time transmission unit after optical amplification can enter the next level through the fiber link; if the jth bidirectional optical amplifying unit loses the tracking of the backward timing signal beyond the set time threshold (such as 100 s), it is restored to its initial state, and the sequential synchronization step is returned;

the first fiber-optic time transfer unit measures the time difference $T_{AB}$ between the time of the local 1PPS transmitted in step (i) and the 1PPS received from the second fiber-optic time transfer unit, and decodes $T_{BA}$ and $\tau_d$ from the timecode. And the next time the local 1PPS is detected, $T_{AB}$ is encoded into the timecode containing the local 1PPS, and sent it to the second fiber-optic time transfer unit through the fiber link, and the optical signal transmission is turned off for the rest of the time; if the first fiber-optic time transfer unit does not receive the timing signal sent by the second fiber-optic time transfer unit beyond the set time threshold, it is restored to its initial state, and the sequential synchronization step is returned;

the first fiber-optic time transfer unit calculates the clock bias between the first clock source and the second clock source according to formula (12):

$$\Delta\tau_{12} = \frac{1}{2}[(T_{AB} - 2T_{BA} - \tau_d) + (\tau_A^T - \tau_A^R + \tau_B^R - \tau_B^T)] \quad (0)$$

where $\tau_A^T$ and $\tau_A^R$ are the transmission and reception delay of the first fiber-optic time transfer unit, which can be obtained by device calibration; $\tau_B^T$ and $\tau_B^R$ are the transmission and reception delay of the first fiber-optic time transfer unit, which can be obtained by device calibration.

I claim:

1. A system for high-precision long-distance distributed fiber-optic time transfer, comprising
   a first clock source,
   a first fiber-optic time transfer unit (1),
   N relay and user units,
   M bidirectional optical amplifying units,
   a second fiber-optic time transfer unit (2), and
   a second clock source,
   wherein the first clock source is connected to the first fiber-optic time transfer unit through an electrical connection;
   the first fiber-optic time transfer unit, the N relay and user units, the M bidirectional optical amplifying units, and the second fiber-optic time transfer unit are connected by fiber to form a single-fiber bidirectional series path, the first fiber-optic time transfer unit and the second fiber-optic time transfer unit are respectively located at one and the other end of the single-fiber bidirectional series path, and the order of the N relay and user units and the M bidirectional optical amplifying units on the series path is arbitrary;
   the second fiber-optic time transfer unit is connected to the second clock source through an electrical connection;
   the timing signal output by the first clock source is transmitted through the first fiber-optic time transfer unit, along the single-fiber bidirectional series path, passes through the optical-electric-optical relay of the N relay and user units, and the optical amplification of the M bidirectional optical amplifying units, and reaches the second fiber-optic time transfer unit;
   the timing signal of the second clock source is transmitted through the second fiber-optic time transfer unit, along the single-fiber bidirectional series path, passes through the optical-electric-optical relay of the N relay and user units in reverse, and the optical amplification of the M bidirectional optical amplifying units, and reaches the first fiber-optic time transfer unit;

the first fiber-optic time transfer unit measures the time interval between the timing signal from the second fiber-optic time transfer unit and the timing signal of the first clock source, and transmits the time interval to the relay and user units and the second fiber-optic time transfer unit through the single-fiber bidirectional series path;

the second fiber-optic time transfer unit measures the time interval between the timing signal from the first fiber-optic time transfer unit and the timing signal of the second clock source, and transmits the time interval to the relay and user units and the first fiber-optic time transfer unit through the single-fiber bidirectional series path; and the first fiber-optic time transfer unit (1), the set relay and user units, and the second fiber-optic time transfer unit (2) obtain the time difference between the local timing signal of each unit and the timing signal of the first clock source according to the measured time interval information they received, thereby realizing high-precision distributed time transfer.

2. The system for high-precision long-distance distributed fiber-optic time transfer of claim 1, wherein the first fiber-optic time transfer unit (1) comprises a first time codec module (1-1), a first time interval measurement module (1-2), a first optical transceiver module (1-3), a first optical switch module (1-4), a first bidirectional multiplexing module (1-5), and a first control and processing module (1-6);

the first time codec module (1-1) encodes a time signal from the first clock source and control and status information of the first control and processing module (1-6) into the timecode, and outputs it to the first optical transceiver module (1-3); the time signal of the first optical transceiver module (1-3) is decoded, the extracted timing signal is output to the first time interval measurement module (1-2), and the measured time interval, and control and state information from the second fiber time transfer unit are extracted and output to the first control and processing module (1-6);

the first time interval measurement module (1-2) receives the timing signal from the first time codec module (1-1) and the first clock source, and the control signal of the first control and processing module (1-6), tests the time interval between the two input timing signals, and output the measured time interval to the first control and processing module (1-6);

the first optical transceiver module (1-3) modulates the timecode output by the first time codec module (1-1) to an optical signal and sends the signal to the first optical switch module (1-4); the first optical transceiver module simultaneously converts the optical signal from the first bidirectional multiplexing module (1-5) into an electrical signal and sends it to the first time codec module (1-1);

the first optical switch module (1-4) receives the optical signal from the first optical transceiver module (1-3), and the control signal of the first control and processing module (1-6), and sends the optical signal of the first optical transceiver module (1-3) to the first bidirectional multiplexing module (1-5);

the first bidirectional multiplexing module (1-5) inputs the optical signal from the first optical switch module (1-4) into the single-fiber bidirectional series path, and simultaneously outputs the optical signal from the same single-fiber bidirectional series path to the first optical transceiver module (1-3); and the first control and processing module (1-6) receives the time interval, control and status information input by the first time codec module (1-1), and the time interval input by the first time interval measurement module (1-2), and the first control and processing module calculates the clock bias between the first clock source and the second clock source; it sends time coding and decoding control signals, status and control information for access and maintenance of the single-fiber bidirectional series path to the first time codec module (1-1); it sends control and configuration information to the first fiber time interval measurement module (1-2) to control the measurement and reading of the time interval; it sends the control signal to the first optical switch module (1-4) to control the opening and closing of the optical switch.

3. The system for high-precision long-distance distributed fiber-optic time transfer of claim 1, wherein the second fiber-optic time transfer unit is composed of a second time codec module (2-1), a timing signal adjustment module (2-2), a second optical transceiver module (2-3), a second optical switch module (2-4), a second bidirectional multiplexing module (2-5), a second control and processing module (2-6), and a second time interval measurement module (2-7);

the second time codec module (2-1) encodes the timing signal from the timing signal adjustment module (2-2), the control and status information of the second control and processing module (2-6) into the timecode, and outputs it to the second optical transceiver module (2-3); the time signal of the second optical transceiver module (2-3) is decoded, and the extracted timing signals are respectively output to the timing signal adjustment module (2-2) and the second time interval measurement module (2-7), the measured time interval, and control and state information from the first fiber-optic time transfer unit are extracted and output to the second control and processing module (2-6);

the timing signal adjustment module (2-2) receives the timing signal from the second time codec module (2-1), performs delay adjustment on the timing signal, and outputs the timing signal after the delay adjustment to the second time codec module (2-1) and the second time interval measurement module (2-7) respectively;

the second optical transceiver module (2-3) modulates the timecode output by the second time codec module (2-1) to an optical signal and sends the signal to the second optical switch module (2-4); the second optical transceiver module (2-3) simultaneously converts the optical signal from the second bidirectional multiplexing module (2-5) into an electrical signal and sends it to the second time codec module (2-1);

the second optical switch module (2-4) receives the optical signal from the second optical transceiver module (2-3), and the control signal of the second control and processing module (2-6), and sends the optical signal of the second optical transceiver module (2-3) to the second bidirectional multiplexing module (2-5);

the second bidirectional multiplexing module (2-5) inputs the optical signal from the second optical switch module (2-4) into the fiber link, and outputs the optical signal from the same fiber link to the second optical transceiver module (2-3);

the second control and processing module (2-6) receives the time interval, control and status information input by the second time codec module (2-1), and the time interval input by the second time interval measurement module (2-7), and calculates the clock bias between the first clock source and the second clock source; it sends time coding and decoding control signals to the second time codec module (2-1); it sends control and configuration information to the second fiber time interval measurement module (2-7) to control the measurement and reading of the time interval; it sends the control signal to the second optical switch module (2-4) to control the opening and closing of the optical switch; and the second time interval measurement module (2-7) receives the timing signal from the second time codec module (2-1) and the second clock source, and tests the time interval between the two input timing signals; it also receives the timing signal output by the second time codec module (2-1) and the timing signal adjustment module (2-2), and tests the time interval between the two; it outputs the measured time interval to the second control and processing module (2-6).

4. The system for high-precision long-distance distributed fiber-optic time transfer of claim 1, wherein the relay and user units have a first, a second, and a third modes of operation, in the first mode of operation, the relay and user units perform optical-electric-optical relay on the optical signals transmitted forward and backward;

in the second mode of operation, the relay and the user units perform optical-electric-optical relay on the optical signals transmitted forward and backward, and realize synchronization of the timing information of each unit of local clock source with the first clock source; and in the third mode of operation, the relay and the user units perform optical-electric-optical relaying on the optical signals transmitted forward and backward, and output the timing signal synchronized with the first clock source.

5. The system for high-precision long-distance distributed fiber-optic time transfer of claim 4, wherein the relay and user units working in the first mode of operation comprises a 2×2 optical switch (3-1), a photoelectric conversion and signal processing module (3-2), an electro-optic conversion module (3-3), a decoding module (3-4) and a control module (3-5);

port 1 and port 2 of the 2×2 optical switch (3-1) are connected to the forward input and backward input of the fiber link respectively, and port 3 and port 4 are connected to the photoelectric conversion and signal processing module (3-2) and electro-optic conversion module (3-3) respectively;

under the control of the control signal input by the control module (3-5), the forward optical signal of the input port 1 of the fiber link is switched to port 3 and output to the photoelectric conversion and signal processing module (3-2), and the optical signal input by the electro-optic conversion module (3-3) to port 4 is output to port 2;

under the control of the control signal input by the control module (3-5), the backward optical signal of the input port 2 of the fiber link is switched to port 3 and output to the photoelectric conversion and signal processing module (3-2), and the optical signal input by the electro-optic conversion module (3-3) to port 4 is output to port 1;

the photoelectric conversion and signal processing module (3-2) converts the optical signal from port 3 of the 2×2 optical switch (3-1) into an electrical signal, which is further processed and input to the electro-optical conversion module (3-3) and the decoding module (3-4);

the electro-optic conversion module (3-3) converts the electrical signal from the electro-optical conversion and signal processing module (3-2) into an optical signal, and input it to port 4 of the 2×2 optical switch (3-1);

the decoding module (3-4) receives the timecode input by the photoelectric conversion and signal processing module (3-2), decodes it and outputs the information extracted from the timecode to the control module (3-5); and the control module (3-5) receives the information input by the decoding module (3-4) and outputs a state control signal to the 2×2 optical switch (3-1) accordingly.

6. The system for high-precision long-distance distributed fiber-optic time transfer of claim 4, wherein the relay and user units working in the second mode of operation comprises a 2×2 optical switch (4-1), a photoelectric conversion and signal processing module (4-2), an electro-optic conversion module (4-3), a decoding module (4-4), a control module (4-5), a time interval measurement module (4-6) and a local clock source (4-7);

port 1 and port 2 of the 2×2 optical switch (4-1) are connected to the forward input and backward input of the fiber link respectively, and port 3 and port 4 are connected to the photoelectric conversion and signal processing module (4-2) and electro-optic conversion module (4-3) respectively;

under the control of the control signal input by the control module (4-5), the forward optical signal of the input port 1 of the fiber link is switched to port 3 and output to the photoelectric conversion and signal processing module (4-2), and the optical signal input by the electro-optic conversion module (4-3) to port 4 is output to port 2;

under the control of the control signal input by the control module (4-5), the backward optical signal of the input port 2 of the fiber link is switched to port 3 and output to the photoelectric conversion and signal processing module (4-2), and the optical signal input by the electro-optic conversion module (4-3) to port 4 is output to port 1;

the photoelectric conversion and signal processing module (4-2) converts the optical signal from port 3 of the 2×2 optical switch (4-1) into an electrical signal, which is further processed and input to the electro-optical conversion module (4-3) and the decoding module (4-4);

the electro-optic conversion module (4-3) converts the electrical signal from the electro-optical conversion and signal processing module (4-2) into an optical signal, and input it to port 4 of the 2×2 optical switch (4-1);

the decoding module (4-4) receives the timecode input by the photoelectric conversion and signal processing module (4-2), decodes it, outputs the information extracted from the timecode to the control module (4-5), and outputs the extracted timing signal to the time interval measurement module (4-6);

the control module (4-5) receives the information input by the decoding module (4-4) and the time interval input by the time interval measurement module (4-6);

according to the received information, it calculates the clock bias between the local clock source (4-7) and the first clock source, synchronizes the local clock source with the first clock source, outputs the state control signal to the 2×2 optical switch (4-1), sends the control and configuration information to the time interval measurement module (4-6), and sends the time synchronization control signal to the local clock source (4-7);

the time interval measurement module (4-6) receives the forward and backward timing signals input by the decoding module (4-4) and the timing signal input by the local clock source (4-7), measures the time interval between the forward and backward timing signals, and the time interval between the forward timing signal and the timing signal of the local clock source (4-7);

under the control of the control signal input by the control module (4-5), the measured time interval is output to the control module (4-5); and the local clock source (4-7) outputs the local timing signal to the time interval measurement module (4-6), receives the control signal input by the control module (4-5), and outputs the timing signal synchronized with the first clock source.

7. The system for high-precision long-distance distributed fiber-optic time transfer of claim 4, wherein the relay and user units working in the third mode comprises a 2×2 optical switch (5-1), a photoelectric conversion and signal processing module (5-2), an electro-optic conversion module (5-3), a decoding module (5-4), a control module (5-5), a time interval measurement module (5-6) and a timing adjustment module (5-7);

port 1 and port 2 of the 2×2 optical switch (5-1) are connected to the forward input and backward input of the fiber link respectively, and port 3 and port 4 are connected to the photoelectric conversion and signal processing module (5-2) and electro-optic conversion module (5-3) respectively;

under the control of the control signal input by the control module (5-5), the forward optical signal of the input port 1 of the fiber link is switched to port 3 and output to the photoelectric conversion and signal processing module (5-2), and the optical signal input by the electro-optic conversion module (5-3) to port 4 is output to port 2;

under the control of the control signal input by the control module (5-5), the backward optical signal of the input port 2 of the fiber link is switched to port 3 and output to the photoelectric conversion and signal processing module (5-2), and the optical signal input by the electro-optic conversion module (5-3) to port 4 is output to port 1;

the photoelectric conversion and signal processing module (5-2) converts the optical signal from port 3 of the 2×2 optical switch (5-1) into an electrical signal that is further processed and input to the electro-optical conversion module (5-3) and the decoding module (5-4);

the electro-optic conversion module (5-3) converts the electrical signal from the electro-optical conversion and signal processing module (5-2) into an optical signal, and input it to port 4 of the 2×2 optical switch (5-1);

the decoding module (5-4) receives the timecode input by the photoelectric conversion and signal processing module (5-2), decodes it, outputs the information extracted from the timecode to the control module (5-5), and outputs the extracted timing signal to the time interval measurement module (5-6) and the timing adjustment module (5-7);

the control module (5-5) receives the information input by the decoding module (5-4) and the time interval input by the time interval measurement module (5-6);

according to the received information, it adjusts the timing adjustment module (5-7), outputs the timing signal synchronized with the first clock source, outputs the state control signal to the 2×2 optical switch (5-1), sends the control and configuration information to the time interval measurement module (5-6);

the time interval measurement module (5-6) receives the forward and backward timing signals input by the decoding module (5-4), measures the time interval between the forward and backward timing signals, and outputs the measured time interval to the control module (5-5) under the control of the control signal input by the control module (5-5); and the timing adjustment module (5-7) receives the control signal input by the control module (5-5), performs delay adjustment on the forward timing signal input by the decoding module (5-4), and outputs the timing signal synchronized with the first clock source.

8. A time transfer method by the system for high-precision long-distance distributed fiber-optic time transfer as described in claim 1, comprising (1) sequential synchronization:

starting optical signal transmission when the first fiber-optic time transfer unit detects the local timing signal input by the first clock source;

sending the optical signal containing the timecode of local timing signal and control and state information to the single-fiber bidirectional path;

closing the optical signal transmission after the transmission is completed;

initializing and maintaining a state of a 2×2 optical switch as forward transmission in the ith (i=1, 2 . . . N) relay and user unit after startup;

splitting the optical signal from the first fiber-optic time transfer unit into a first part and a second part after photoelectric conversion and signal processing;

decoding the first part of the optical signal to identify the time signal;

determining, according to time $t_{fi}$ when the time signal is recognized, next time $t_{fi1} < t_{fi} + T - t_{s1}$ at which the 2×2 optical switch is set as forward transmission and next time $t_{bi1} \geq t_{fi1} + \tau_c - t_{s1}$ at which the 2×2 optical switch is set as backward transmission are determined, wherein T is a period of the timing signal being transmitted, $\tau_c$ is a length of timecode being transmitted as T, $t_{s1}$ is switching time of the 2×2 optical switch;

setting and maintaining the 2×2 optical switch at forward transmission state, when the set time $t_{fi1}$ is reached;

setting and maintaining the 2×2 optical switch at the backward transmission state when the set time $t_{bi1}$ is reached;

converting the second part of the forward transmitted signal by electro-optical conversion after photoelectric conversion and signal processing, outputting the converted signal by the 2×2 optical switch, and transmitting the signal to a next unit via the fiber-optic;

light amplifying the forward optical signal in the jth (j=1, 2 . . . M) bidirectional optical amplifying unit;

delaying the received timing signal from the first fiber-optic time transfer unit by $\tau_d \geq \tau_c + t_s$ by the second fiber-optic time transfer unit, where $t_s$ is the time when the optical signal transmission is started, and starting optical signal transmission;

transmitting the timecode to the first fiber-optic time transfer unit through the fiber link, and turning off the optical signal transmission for rest of the time;

performing optical-electric-optical relay on arrived backward transmitted optical signal in the ith relay and user unit;

light amplifying the arrived backward transmitted optical signal in the jth bidirectional optical amplifying unit;

confirming that the sequential synchronization is successful when the first fiber-optic time transfer unit receives the timecode sent by the second fiber-optic time transfer unit;

(2) Long-distance distributed fiber-optic time transfer:

(i) starting optical signal transmission when the first fiber-optic time transfer unit detects the local timing signal of the first clock source;

transmitting the local timing signal, the time interval T measured locally, and the timecode of the control and state information to the second fiber-optic time transfer unit through the fiber link, and turning off the optical signal transmission after the transmission is completed;

(ii) setting and maintaining the 2×2 optical switch at forward transmission state in the ith relay and user unit at the set forward transmission time $t_{fi1}$ so that the forward transmitted optical signal is transmitted to the next level through the optical-electric-optical relay, and at same time, determining the next time $t_{fi1} < t_{fi} + T - t_{s1}$ at which the 2×2 optical switch is set as forward transmission and the next time $t_{bi1} \geq t_{fi1} + \tau_c + t_{s1}$ at which the 2×2 optical switch is set as backward transmission according to the time $t_{fi}$ at which the forward transmitted signal is received;

restoring the ith relay and user unit to its initial state, setting and maintaining the 2×2 optical at forward transmission state, and returning to the sequential synchronization step, if the ith relay and user unit does not receive the forward timing signal beyond the set time threshold;

decoding the forward timing signal and $T_{AB}$ from the forward transmitted signal if the ith relay and user unit works in a second mode or a third mode;

(iii) light amplifying the forward optical signal in the jth bidirectional optical amplifying unit;

restoring the jth bidirectional optical amplifying unit to its initial state and returning to the sequential synchronization step, if the jth bidirectional optical amplifying unit loses the tracking of the forward timing signal beyond the set time threshold;

(iv) extracting the timing signal by the second fiber-optic time transfer unit from the received timecode sent by the first fiber-optic time transfer unit and measuring a difference $T_{BA}$ between the received timing signal transferred by the first fiber-optic time transfer unit and the timing signal of the second fiber-optic time transfer unit;

at same time, starting the optical signal transmission, encoding the time difference $T_{BA}$ and $\tau_d$ into the timecode, modulating the timecode into a same wavelength as the forward transmitted optical signal, and transmitting the timecode to a same fiber link, after delaying the received timing signal sent from the first fiber-optic time transfer unit by a fixed time $\tau_d$, closing the optical signal transmission after the transmission is completed;

restoring the second fiber-optic time transfer unit to its initial state and returning to the sequential synchronization step, if the second fiber-optic time transfer unit does not receive the timing signal sent by the first fiber-optic time transfer unit beyond the set time threshold;

calculating the second fiber-optic time transfer unit a clock bias between the first clock source and the second clock source according to formula (1):

$$\Delta\tau_{12} = \frac{1}{2}[(T_{AB} - 2T_{BA} - \tau_d) + (\tau_A^T - \tau_A^R + \tau_B^R - \tau_B^T)], \quad (1)$$

wherein $\tau_A^T$ and $\tau_B^T$ are transmission and reception delays of the first fiber-optic time transfer unit, respectively, and $\tau_A^R$ and $\tau_B^R$ are transmission and reception delays of the second fiber-optic time transfer unit obtained by device calibration, respectively;

(v) setting and maintaining the 2×2 optical switch at backward transmission state at the set backward transmission time $t_{bi1}$ in the ith relay and user unit so that the backward transmitted optical signal is transmitted to the next level through the optical-electric-optical relay;

restoring the ith relay and user unit to its initial state, setting and maintaining the 2×2 optical switch at forward transmission state, and returning to the sequential synchronization step if the ith relay and user unit does not receive the backward timing signal beyond the set time threshold;

decoding the backward timing signal by the ith relay and user unit from the backward transmitted signal, and inputting the decoded backward timing signal to a time interval measurement module, if the ith relay and user unit works in the second mode, testing by the time interval measurement module a time interval $T_p$ between the backward timing signal and the forward timing signal decoded in step (ii) and a time interval $T_{MA}$ between the forward timing signal decoded in step (ii) and the timing signal of the local clock source, and calculating a clock bias between the relay and user unit and the first clock source according to formula (2) to realize distributed time transfer:

$$\Delta\tau = \frac{1}{2}[(T_{AB} - T_p - 2T_{MA}) + (\tau_A^T + \tau_M^R - \tau_M^T - \tau_A^R)], \quad (2)$$

wherein $\tau_A^T$ and $\tau_A^R$ are transmission and reception delays of the first fiber-optic time transfer unit obtained by device calibration, respectively, and $\tau_M^T$ and $\tau_M^R$ are transmission and reception delays of the ith relay and user unit obtained by device calibration, respectively;

decoding the backward timing signal from the backward transmitted signal by the ith relay and user unit and inputting the decoded timing signal to the time interval measurement module, if the ith relay and user unit works in the third mode;

testing a time interval $T_p$ between the forward and backward timing signals decoded in step (ii);

calculating a clock bias between the forward timing signal received by the ith relay and user unit and the timing signal of the first clock source according to formula (3), adjusting and outputting the forward timing signal through the timing signal adjustment module to realize distributed time transmission:

$$\Delta\tau = \frac{1}{2}[(T_{AB} - T_p) + (\tau_A^T + \tau_M^R - \tau_M^T - \tau_A^R)], \quad (3)$$

wherein $\tau_A^T$ and $\tau_A^R$ are transmission and reception delays of the first fiber-optic time transfer unit obtained by device calibration, respectively, and $\tau_M^T$ and $\tau_M^R$ are transmission and reception delays of the ith relay and user unit obtained by device calibration, respectively;

(vi) light amplifying the backward optical signal in the jth bidirectional optical amplifying unit;

restoring the jth bidirectional optical amplifying unit to its initial state and returning to the sequential synchronization step, if the jth bidirectional optical amplifying unit loses the tracking of the backward timing signal beyond the set time threshold; and (vii) receiving the timecode from the second fiber-optic time transfer unit by the first fiber-optic time transfer unit, decoding the timing signal, $T_{BA}$ and $\tau_d$ from the timecode, measuring the time difference $T_{AB}$ between the decoded timing signal and the local timing signal of the first clock source sent in step (i), and returning to step (i);

restoring the first fiber-optic time transfer unit to its initial state and returning to the sequential synchronization step, if the first fiber-optic time transfer unit does not receive the timing signal sent by the second fiber-optic time transfer unit beyond the set time threshold;

calculating by the first fiber-optic time transfer unit a clock bias between the first clock source and the second clock source according to formula (4):

$$\Delta \tau_{12} = \frac{1}{2}[(T_{AB} - 2T_{BA} - \tau_d) + (\tau_A^T - \tau_A^R + \tau_B^R - \tau_B^T)], \quad (4)$$

wherein $\tau_A^T$ and $\tau_A^R$ are transmission and reception delays of the first fiber-optic time transfer unit obtained by device calibration, respectively, and $\tau_B^T$ and $\tau_B^R$ are transmission and reception delays of the second fiber-optic time transfer unit obtained by device calibration, respectively.

9. The time transfer method for the system for high-precision long-distance distributed fiber-optic time transfer of claim 8, wherein port 1 and port 3, port 2 and port 4 of the 2×2 optical switch are in a connected state in the forward transmission state of the 2×2 optical switch of the relay and user unit; and port 1 and port 4, port 2 and port 3 of the 2×2 optical switch are in a connected state in the backward transmission state of the 2×2 optical switch of the relay and user unit.

* * * * *